US007479959B2

(12) United States Patent
Han et al.

(10) Patent No.: US 7,479,959 B2
(45) Date of Patent: Jan. 20, 2009

(54) GEOMETRIC MODELING SYSTEM WITH INTELLIGENT CONFIGURING OF SOLID SHAPES

(75) Inventors: Tao-Yang Han, Marietta, GA (US); Yawei Li, Marietta, GA (US); Bryan Cargill, Marietta, GA (US)

(73) Assignee: Ironclad LLC, Atlanta, GA (US)

( * ) Notice: Subject to any disclaimer, the term of this patent is extended or adjusted under 35 U.S.C. 154(b) by 852 days.

(21) Appl. No.: 10/783,086

(22) Filed: Feb. 23, 2004

(65) Prior Publication Data

US 2005/0188348 A1    Aug. 25, 2005

(51) Int. Cl.
*G06T 17/00* (2006.01)
(52) U.S. Cl. ........................ 345/420; 345/619
(58) Field of Classification Search .................. 345/420, 345/619
See application file for complete search history.

(56) References Cited

U.S. PATENT DOCUMENTS

| | | | | |
|---|---|---|---|---|
| 5,371,845 | A | * 12/1994 | Newell et al. | 715/808 |
| 5,619,630 | A | * 4/1997 | Minami et al. | 345/619 |
| 5,861,889 | A | 1/1999 | Wallace et al. | |
| 5,894,310 | A | 4/1999 | Arsenault et al. | |
| 6,016,147 | A | * 1/2000 | Gantt | 345/420 |
| 6,037,945 | A | * 3/2000 | Loveland | 345/420 |
| 6,063,128 | A | * 5/2000 | Bentley et al. | 703/6 |
| 6,128,631 | A | 10/2000 | Wallace et al. | |

(Continued)

OTHER PUBLICATIONS

"Pro/Engineer Behavioral Modeling", Datasheet, PCT, © 2002, Parametric Technology Corporation.

(Continued)

*Primary Examiner*—Ulka Chauhan
*Assistant Examiner*—Daniel Washburn
(74) *Attorney, Agent, or Firm*—Nixon & Vanderhye, P.C.

(57) ABSTRACT

A computer program product (190), and a geometric modeling system which executes the program, provides a visual depiction of a three dimensional object upon a display device (158). The program (190) detects insertion of a generic movant solid shape into a scene for relating the movant sold shape to a target or host solid shape. Upon detection of insertion, the program configures data representative of one of the movant solid shape and the target solid shape. The representative data is configured so that one of the solid shapes of the relation is depicted on the display device as having a particular attribute(s) in accordance with (1) an attribute of the solid shape with which it relates; and/or (2) one or more predetermined rules. The program can configure the representative data of the movant solid shape in accordance with an attribute of the target solid shape in various ways (e.g., as having a particular size or dimension for compatibility with the target solid shape, or as having a particular position or physical orientation relative to the target solid shape). The predetermine rule(s) by which the program can configure the movant solid shape can be based on diverse criteria (e.g., as a particular member of a class of solid shapes represented by a generic solid shape, as a preferred procurement item). In an example implementation, configuration of the movant solid shape, and in some situations the target solid shape, is facilitated by the program allocating a part object for each of solid shape, with each part object having one or more connector objects conceptually associated with corresponding physical locations on the respective solid shape.

43 Claims, 17 Drawing Sheets

U.S. PATENT DOCUMENTS

| | | | |
|---|---|---|---|
| 6,219,049 B1 * | 4/2001 | Zuffante et al. | 715/764 |
| 6,295,069 B1 | 9/2001 | Shirur | |
| 6,392,645 B1 | 5/2002 | Han et al. | |
| 6,434,441 B1 * | 8/2002 | Beauchamp et al. | 700/98 |
| 6,489,957 B1 | 12/2002 | Han et al. | |
| 6,525,745 B1 | 2/2003 | Phelan et al. | |
| 7,079,990 B2 * | 7/2006 | Haller et al. | 703/2 |
| 2002/0052807 A1 | 5/2002 | Han et al. | |
| 2002/0107673 A1 * | 8/2002 | Haller et al. | 703/1 |
| 2005/0162419 A1 * | 7/2005 | Kim et al. | 345/419 |

OTHER PUBLICATIONS

Simultaneous Product Development with the IX SPeeD™ Suite, ImpactXoft, © 2003-2004 ImpactXoft.

"PTC Releases Pro/Engineer® Wildfire™ 2.0", Apr. 13, 2004, printed from http://www.pct.com/appserver/it/cm/cda/template... Jun. 8, 2004.

"IX SPeeD V5 Suite", ImpactXoft, © 2003-2004, ImpactXoft, printed from http://www.impactxoft.com/ on Jun. 8, 2004.

Rogerson et al, "Inside COM" (Microsoft Press, 1997), ISBN 1-57231-349-8.

* cited by examiner

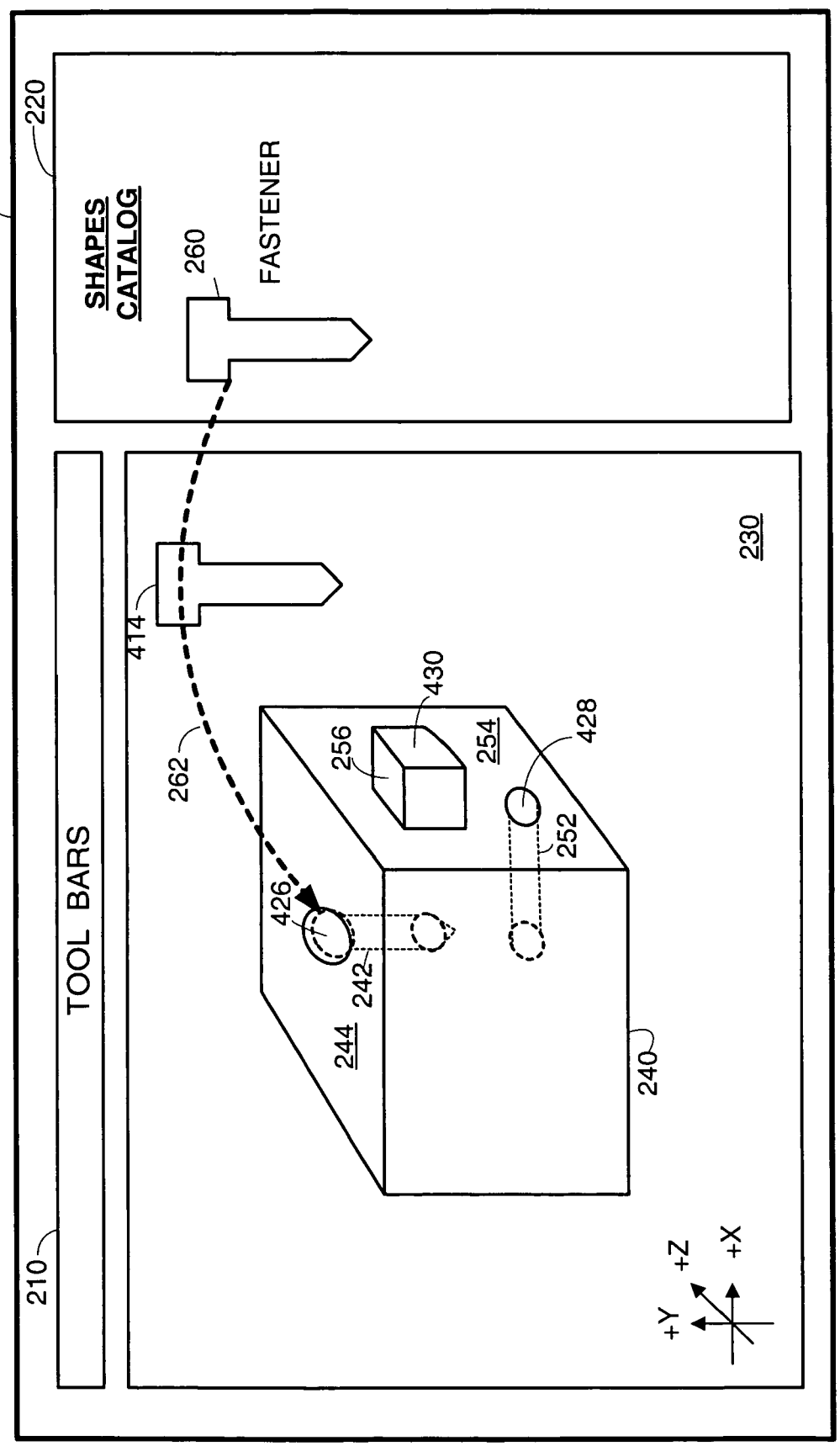

| Fig. 5A |
| Fig. 5B |
| Fig. 5C |
| Fig. 5D |

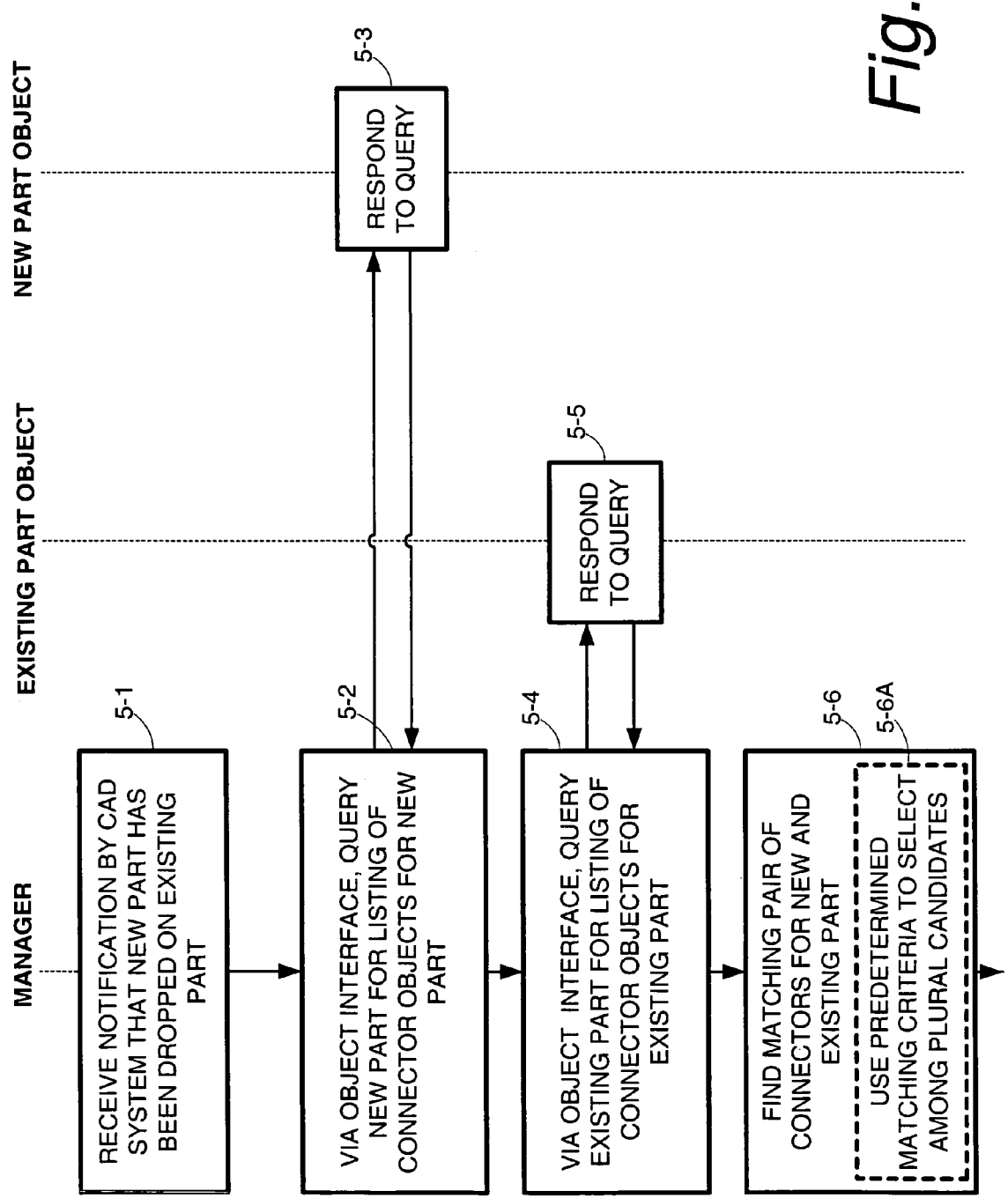

GEOMETRIC MODELING SYSTEM WITH INTELLIGENT CONFIGURING OF SOLID SHAPES

BACKGROUND

1. Field of the Invention

The present invention pertains to computerized three dimensional geometric modeling systems.

2. Related Art and other Considerations

The computer has greatly affected essentially all forms of information management, including the geometric modeling arts. Nowadays there are numerous computer program products that allow the user to create, store, and modify geometric models and their graphical renderings of various types on a display screen, and to print or otherwise output such geometric models and their renderings. Such geometric models and their graphical renderings span the gambit from simple to complex, and can vary in subject matter, e.g., artistic, industrial, etc. Some geometric modeling computer program products are two dimensional, providing only length and width dimensions of solid shapes or parts. The more complex three dimensional (3D) computer program products, on the other hand, provide three dimensions—length, width, and depth/thickness.

Three dimensional geometric modeling programs can generate a scene or part which can comprise one or more constituent 3D solid shapes. Some three dimensional geometric modeling programs utilize Component Object Modeling (COM) and operate in conjunction with COM interfaces. Component Object Modeling and COM interfaces are described, e.g., in such publications as Rogerson, Dale, *Inside COM* (Microsoft Press, 1997), ISBN 1-57231-349-8. In one example object-oriented geometric modeling computer program, an executable object is used to define and generate each solid shape. The object for each solid shape can have several associated components, the components being a combination of executable code and data structure. U.S. Pat. No. 5,894,310, entitled "Intelligent Shapes For Authoring Three-Dimensional Models", incorporated herein by reference, discloses solid shapes having various components including a boundary representation component, an historical component, a visual component; a physical component; a functional component; and a user interface behavioral component. The user interface behavioral component defines actions to be taken on specific user interface events such as drag, drop, and others.

Examples of three dimensional geometric modeling systems are provided in the following, all of which are incorporated herein by reference in their entirety: U.S. Pat. Nos. 6,392,645; 6,489,957; and 6,525,745.

In a typical three dimensional geometric modeling program (whether COM-based or not), using a graphical user interface (GUI) a human designer can select a solid shape from a catalog or the like. The catalog with its library of solid shapes is usually displayed alongside or as a window adjacent a display of an assembly-in-progress on a screen of a display device. Upon selection of the solid shape, the designer can drag or drop the selected solid shape into the assembly. In some systems, one or more of the operations of selecting, dragging, or dropping the solid shape may be accomplished using a graphics tool. An example of such a suitable graphics tool is described in the following, all of which are incorporated herein by reference in their entirety: U.S. Pat. Nos. 5,861,889; 6,128,631; and, 6,295,069.

For example, if the selected solid shape is a threaded screw, the designer can drag or drop the screw into a screw hole provided in a solid shape which already comprises the assembly (e.g., into a screw hole of a block already included in the assembly). But before doing so, the designer must select the appropriate screw from the catalog. There may be many different types of screws included in the catalog, for example: flat head screws, cross head screws, arch-headed screws, single-threaded screws, double-threaded screws. Each of these types may further be classified as Phillips head or otherwise. The designer must decide which type of screw is appropriate for the screw hole (the screw hole having already been graphically constructed in the block). Of course, the designer must also select a screw having an appropriate size (e.g., diameter and shaft length) for the existing screw hole. The designer must locate the appropriate size screw in the catalog, which may feature many sizes of screws from which to select. In fact, there may be so many screws available to the designer that the catalog may have several sub-catalogs. For example, upon the designer mentally determining that desired screw is a flat head screw, the designer may have to open a special catalog for screws, and within the screw catalog select a sub-catalog for flat head screws, and within the flat head screw sub-catalog select the exact screw of appropriate diameter and length. Further, the price, availability, experience, company preference, and other factors may affect the decision as to which particular type of screw to use. Nowadays the human designer must be cognizant of these factors if the factors are involved, although such cognizance is often achieved only with considerable experience and dependent upon mental recall.

After selecting the exact screw of the precise screw type and size, the designer must place (e.g., drop and/or drag) the screw into the correct position on the receiving solid shape, e.g. into the screw hole. Placing the selected solid shape (e.g., the selected screw) in the assembly involves precisely locating the movant solid shape relative to the target solid shape (e.g., precisely locating the screw relative to the screw hole), and then orienting the screw properly (e.g., so that the screw shaft extends into the hole in the proper direction). Once the screw is put into the assembly, the designer may want to apply a constraint between the hole and the screw to maintain their relative position.

Some geometric modeling programs assist manual positioning of a selected solid shape into an assembly by providing a snap attachment or insertion of the selected shape into the assembly. There are essentially two types of "snaps". A first type of snapping involves positioning the selected shape in the assembly based on discrete positions of a 3D grid underlying the space occupied by the assembly. A second type of snapping involves certain specific geometrical elements, such as the center of sphere, axis of cylinder, vertex point or middle point of an edge, etc.

While various graphical tools such as those mentioned above facilitate selection and movement of a solid shape into an assembly, the operations described above require considerable attention and expertise for the designer. For example, the designer must know which type of screw is appropriate for the assembly, and remember the requirements of the screw hole for selecting the size of the screw. Moreover, other than what may be mentally recalled, the designer is unable to utilize business, historical, expertise, or environmental factors in selecting the particular solid shape for inclusion in the assembly.

In the Pro/Engineer product of PTC the behavior of a design is captured in behavioral features which appear on a part model tree. Supposedly a behavioral feature can be used to drive Part geometry through sensitivity, feasibility, and optimization studies.

The IX Functional Modeling of ImpactXoft is a behavior-driven approach to modeling in which a geometric model is generated automatically to meet certain requirements. The functional modeling approach places an emphasis on the way that volumes and features interact in the context of a part design. The three essential elements of functional modeling include functional bodies, volumes and features.

Both behavioral modeling and functional modeling provide certain intelligence in determining part geometry to satisfy functional and/or behavior requirements. However, they do not provide the intelligence in selecting parts from part libraries in considering the price, availability, experience, company preference, and the sizing and position of the parts.

Companies today are facing ever increasing competitive pressures from a growing global market place. These pressures are requiring companies to dramatically shorten the design cycle and time to market, while providing even better product quality. What is needed, therefore, and an object of the present invention, is a geometric modeling system which aids a designer in selecting, sizing, and positioning of parts, whether in assembly design or in other areas such as computer aided engineering (CAE) (e.g., for bringing intelligence about engineering simulation into part selection and positioning as well as boundary condition creation).

BRIEF SUMMARY

A computer program product, and a geometric modeling system which executes the program, provides a visual depiction of a three dimensional object upon a display device. The program detects insertion of a movant solid shape into a context wherein the movant solid shape enters a relation (is attached or positionally dependent upon) with another solid shape. The extant solid shape belonging to the relation is referred to as a "target" or "host" solid shape. The context may occur in a scene, assembly design, or other computer aided engineering project. Upon detection of insertion, the program configures data representative of one of the movant solid shape and the target solid shape. The representative data is configured so that one of the solid shapes of the relation is depicted on the display device as having a particular attribute (s) in accordance with (1) an attribute of the solid shape with which it relates; and/or (2) one or more predetermined rules.

The program can configure the representative data of the movant solid shape in accordance with an attribute of the target solid shape in various ways. For example, the program can configure the representative data of the movant solid shape as having a particular size or dimension for compatibility with the target solid shape, or as having a particular position or physical orientation relative to the target solid shape.

The predetermine rule(s) by which the program can configure the representative data of the movant solid shape can be based on diverse criteria. For example, the predetermined rule(s) can be applied to configure the representative data of the movant solid shape as a particular member of a class of solid shapes represented by a generic solid shape. Alternatively or additionally, the predetermined rule(s) can be applied to configure the representative data of the movant solid shape as a preferred procurement item. Examples of preferred procurement items include a procurement item from a preferred one vendor of multiple candidate vendors, and/or an items selected based on inventory or availability. The predetermine rule(s) may be applied using a rule data base, which may operate in conjunction with an Enterprise Resource Planning (ERP) system.

As an optional and separate feature, the program includes the preferred procurement item in one or both of a bill of materials and a build list for an assembly comprising the movant solid shape and the target solid shape.

In an example implementation, configuration of the representative data of the movant solid shape, and/or in some situations the representative data of the target solid shape, is facilitated by the program allocating a connector object for at least some and preferably each of the plural solid shapes. Each connector object is conceptually associated with a corresponding physical location on the respective solid shape. The connector object may include configuration information pertaining to how the representative data of its solid shape is to be configured on the display device relative to another solid shape, and in some cases certain call back functionality for enabling the connector object to access rules stored in the rule data base.

In the example implementation, a movant solid shape is dropped or dragged into a context for a relation with the target solid shape. Upon the dropping or dragging, the program determines an affinity of a connector object of a movant solid shape and a connector object of the target solid shape. Then, in preparing to display the movant solid shape and the target solid shape relative to one another on the display device, the program can automatically configure the representative data of one of the movant solid shape and the target solid shape in accordance with the configuration information stored in an object for the other solid shape in the relation.

The configuration information used to configure the representative data for a solid shape can take one or more of several types of forms. For example, the configuration information can be connector affinity eligibility information which is used by the program to determine one or more connector objects of the target solid shape that are eligible for pairing with the connector object for the movant solid shape. The connector affinity eligibility information may be or comprise connector naming nomenclature or typing nomenclature by which a connector object of the movant solid shape and a connector object of the target solid shaped can be paired. Moreover, when the program determines that plural connector objects of the target solid shape can be paired with the connector object for the movant solid shape, the program can invoke a predetermined rule for choosing one of the plural connector objects of the target solid shape to be paired with the connector object for the movant shape. For example, the predetermined rule may require that the program choose, from the plural connector objects of the target solid shape, a connector object having an associated physical location which, judging from its representative data, will be depicted on the display device as being nearest a physical drop location of the connector object of the movant solid shape.

The configuration information can, additionally or alternatively, include one or more of the following: geometry dependency information (which enables the program to determine at least one physical parameter of one of the target solid shape and the movant solid shape); positional information (which can be utilized by the program to determine how the target solid shape and the movant solid shape are to be oriented relative to one another at the physical locations associated with paired connector objects); and, procurement information (which enables the program to determine a procurement item for the movant solid shape).

In terms of procurement information utilized for configuring the solid shape, the program can determines a preferred procurement item for the movant solid shape based on predetermined criteria. Examples of such predetermined criteria include vendor preference, and/or inventory or availability.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2A is a diagrammatic view depicting example contents of a screen of a display device upon dragging a movant solid shape into an assembly.

FIG. 5A-FIG. 5D are flowcharts showing basic actions performed by an example implementation of an intelligent configurator portion of the computer program of FIG. 3.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer.

Figure 1:
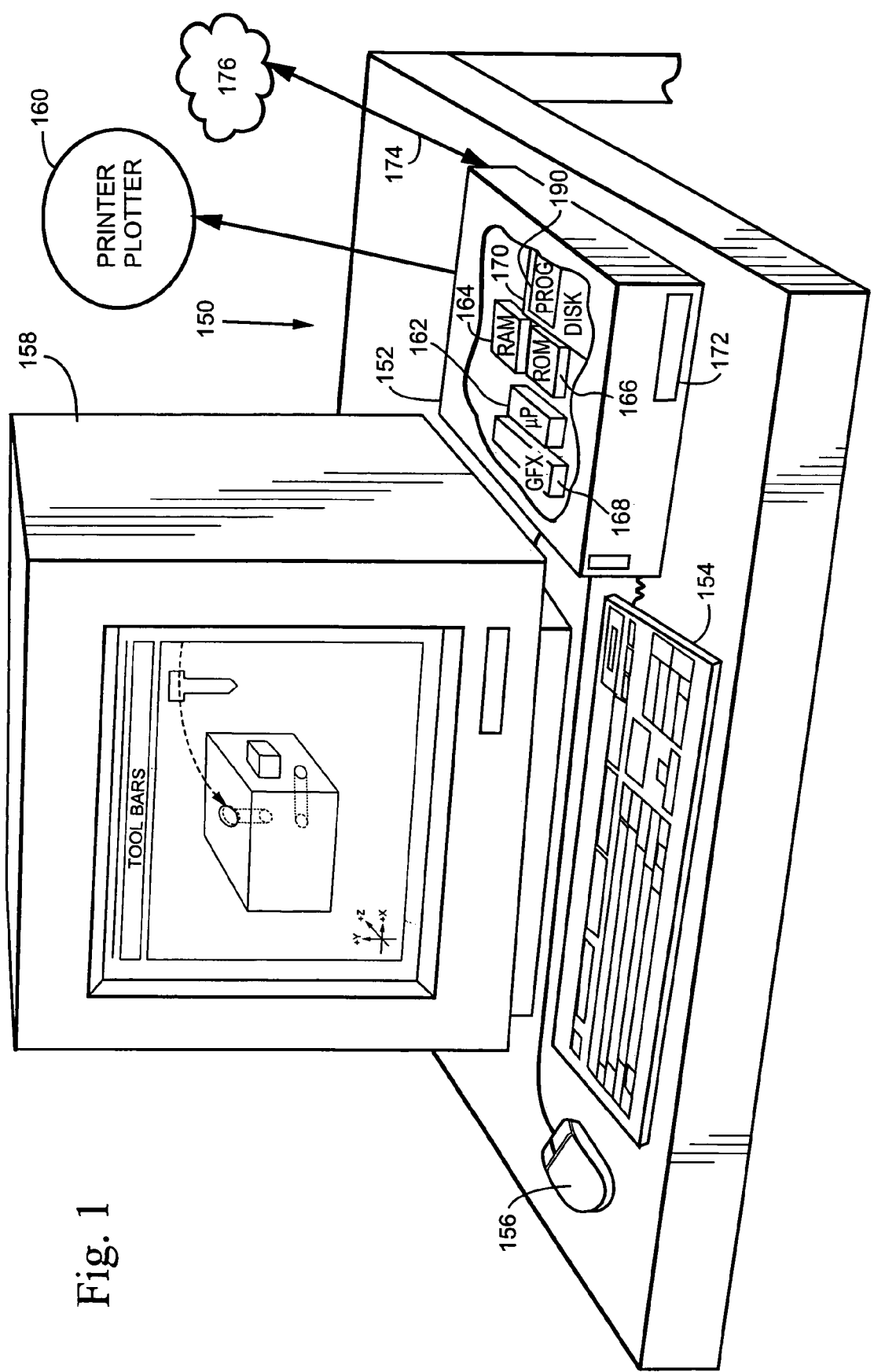
FIG. 1 is a schematic view of an example embodiment of a computer graphics workstation.

FIG. 1 shows an example computer graphics workstation 150 according to an embodiment of the invention. Workstation 150 includes a general purpose computer 152, a keyboard 154, a mouse pointing device 156, a display 158, and a printer/plotter 160. Computer 152 may be, for example, a conventional microcomputer such as an IBM compatible personal computer including a microprocessor 162, random access memory 164, read only memory 166, a graphics video adapter 168, a mass storage device such as a magnetic disk 170, and a disk drive 172. Disk drive 172 may handle an optical and/or floppy diskette, compact disk (CD), or digital video disk (DVD), for example. Computer 152 displays images on display 158 (and/or prints the images on printer/plotter 160) in response to user inputs via keyboard 154 and/or mouse pointing device 156. The computer 152 creates images based on steps it performs under control of a computer program product 190 stored on mass storage device 170 and/or another storage media (e.g., an optical or magnetic disk, not shown) provided via drive 172. A communications connection 174 between computer 152 and a network 176 (e.g., the Internet) may be provided to allow the user to access information from the network and/or exchange information with another computer also connected to the network.

Upon start-up, the three dimensional geometric modeling program 190 generates a screen 200 as shown in FIG. 2A. The screen 200 has various tool bars 210 for browsing a set of catalogs. Of the catalogs included in the catalog set, the currently selected catalog in FIG. 2A is the shapes catalog 220. The shapes catalog 220 includes icons corresponding to solid shapes which can be selected and positioned (clicked, dragged and dropped) into a scene being created in a work space portion 230 of screen 200. For sake of simplicity only one icon is shown in the shapes catalog 220, but it should be understood that plural icons are typically displayed in the catalog. Prior to the time shown in FIG. 2A the work space portion 230 of screen 200 is initially blank, but eventually displays an assembly of one or more solid shapes as a human designer selects and positions (e.g., using a positioning tool or a cursor) the solid shapes from the various catalogs.

At the time actually shown in FIG. 2A, the designer has begun to create an assembly having a first solid shape in the form of a solid rectangular block 240. The designer has formed a first threaded hole 242 in a top surface 244 of solid rectangular block 240, as well as a second threaded hole 252 in a right side surface 254 of solid rectangular block 240. The first hole 242 extends orthogonally to the plane of top surface 244 in a −Y direction of the coordinate system shown on screen 200, while the second hole 252 extends orthogonally to the plane of right side surface 254 in a−X direction. In addition, a boss 256 has been formed on the right side surface 254 of solid rectangular block 240.

Further, at the time shown in FIG. 2A, the designer has selected a fastener icon 260 illustrated in shapes catalog 220 and is in the process of dragging the fastener icon 260 toward the first hole 242 of solid rectangular block 240. By dragging the icon 260 toward first hole 242 as depicted by broken drag line 262, the designer intends to create a fastener solid part which will be inserted into first hole 242, e.g., a threaded screw which fits into and is illustrated as fitting into first hole 242.

The foregoing actions can be performed by a three dimensional modeling or graphics program herein referred to generally as program 190, and particularly by a conventional or general CAD system portion 302 of program 190. Program 190 is stored on disk 172 and executed by microprocessor 162. As herein described and generally illustrated in FIG. 3, in addition to general CAD system portion 302 the program 190 includes an intelligent configurator 304 which accomplishes further actions as herein described. The program 190 including the intelligent configurator 304 operates in conjunction with an object library 306 and a rule database 308. As explained hereinafter, the intelligent configurator 304 includes a manager 310 and several interfaces, including CAD system interface 312; object interface 314; and database interface 316. As an example, the program 190 including the intelligent configurator 304 with its manager 310 can utilize Extensible Markup Language (XML) using an XML parser (either commercial or customized when a specialized data format is utilized) for communication via object interface and database interface.

In one of its aspects, program 190 detects insertion of a "movant" solid shape (such as the fastener depicted by icon 260) into a context. The context may occur in a scene, assembly design, or other computer aided engineering project. A "movant" solid shape is a solid shape which is either created for insertion (e.g., by dragging or dropping) into the context or otherwise moved in the context for relation with (attachment or positionally dependent upon) another solid shape. This another solid shape is herein interchangeably referred to as a "target" or "host" solid shape. Upon detection of insertion, the program configures representative data of one of the movant solid shape and the target solid shape. The representative data is configured so that one of the solid shapes of the relation is depicted on the display device as having a particular attribute(s) in accordance with (1) an attribute of the solid shape with which it relates; and/or (2) one or more predetermined rules.

The icon 260 can generically represent a class of objects, of which one member will ultimately be selected for actual use and display in the assembly. When such generic depiction occurs, the movant solid shape is a generic movant solid shape, e.g., a generic fastener solid shape.

In the manner subsequently explained, when the icon for the generic fastener solid shape selected from shapes catalog 220 is dragged proximate the top surface 244 of solid rectangular block 240, the intelligent configurator 304 and particularly its manager 310 eventually configures the representative data of the fastener solid shape as a threaded flat head Phillips screw. Such configuration results from the ability of intelligent configurator 304 to configure the representative data of the movant solid shape as a particular member of a class of solid shapes represented by a generic solid shape. In this situation, the class of solid shapes is a fastener. The fastener class of solid shapes can include such parts as nails, screws, tacks, staples, and the like. As explained below, the intelligent configurator 304 determines or decides (from requirements, expectations, or rules such as those associated with solid rectangular block 240 or rule database 308) that the fastener utilized for first hole 242 should be a threaded screw, and particularly a flat head Phillips screw. Accordingly, the intelligent configurator 304 automatically configures the particularities of the representative data of the fastener in accordance with such requirements, expectations, or rules.

Thus, in one of its aspects, the intelligent configurator 304 configures the representative data of the movant solid shape as a certain type of part belonging of a generic class of parts. In another distinct or combineable aspect, intelligent configurator 304 configures the representative data of the movant solid shape (which ultimately will be the flat head Phillips screw) as having a particular position or physical orientation relative to the target solid shape. For example, the intelligent configurator 304 advises general CAD system portion 302 to configure the representative data of the so that the fastener solid shape will be positioned in first hole 242 with the shaft of the flat head Phillips screw extending into the channel of the screw hole. Thus, when the icon for the movant solid shape is proximate the solid rectangular block 240, the intelligent configurator 304 automatically positions or snaps the fastener solid shape in an appropriate location on solid rectangular block 240. The intelligent configurator 304 knows or determines the appropriate location on solid rectangular block 240 for the fastener solid shape in view of certain intelligence or information associated with one or both of the target solid shape and the movant solid shape.

The manner of the positioning and/or orientation of a movant solid shape relative to a target solid shape is dependent upon the representative data of one or more of the solid shapes and can be varied and diverse. In the scenario of FIG. 2A as just described, the fastener solid shape is positioned essentially completely within the first hole 242. Such insertion is an example of an enveloping type of positioning of the movant solid shape within the target solid shape. But it should be understood that positioning and orienting of a movant solid shape is not confined to this example. Rather, positioning and orienting of a movant solid shape encompasses all types of predetermined placements of a movant solid shape relative to a target solid shape. While some of the placements may involve contact between essentially all surfaces or points of the respective solid shapes, other placements may involve only partial such contact. For example, the movant solid shape may be positioned so that a surface thereof is tangent to a surface of the target solid shape. In yet other placements, the movant solid shape and the target solid shape may not even contact, but instead have a relative placement that includes a predefined spatial separation.

In some situations, including the situation of FIG. 2A, there may be two or more possible locations for positioning of the movant solid shape. In particular, in the FIG. 2A scenario the fastener solid shape could potentially be positioned either in first hole 242 or second hole 252. If the intelligence or information associated with the solid shapes is such that there are multiple potential positioning sites for the movant solid shape, a predetermined rule or logic may be applied to chose between the multiple potential positioning sites. For example, the predetermined rule may require that the intelligent configurator 304 choose, from the plural connector objects of the target solid shape, a connector object having an associated physical location which, judging from its representative data, will be depicted on the display device as being nearest a physical drop location of the connector object of the movant solid shape. Thus, in the situation shown in FIG. 2A, if the icon for the movant solid shape is hovering over top surface 244, the intelligent configurator 304 will conjecture that the fastener solid shape should be positioned in first hole 242 rather than in second hole 252, and will accordingly automatically position the fastener solid shape in first hole 242.

In positioning the movant solid shape the positioning site selected therefore on the target solid shape, as another aspect of its operation the intelligent configurator 304 also configures the representative data of the movant solid shape to have a particular size or dimension for compatibility with the target solid shape. In the situation shown in FIG. 2A, the solid rectangular block 240 may anticipate that the fastener solid shape which is to be inserted into first hole 242 have a diameter of one half inch and a shaft length of two inches. As the icon 260 of the generic fastener is dragged into work space portion 230, the solid shape corresponding to the icon being dragged as yet does not know what type of fastener it will become, nor its size. But when the movant solid shape is associated with the first hole 242, the intelligent configurator 304 imputes to the movant solid shape not only its type (e.g., flat head Phillips screw), but also size and dimensions suitable for compatibility with the requirements of first hole 242. Thus, when the intelligent configurator 304 makes the association of the movant solid shape and the first hole 242 of solid rectangular block 240, the intelligent configurator 304 automatically attributes to the movant solid shape the particular fastener type of being a flat head Phillips screw and prescribes the length and diameter requirements for the flat head Phillips screw (e.g., a diameter of one half inch and a shaft length of two inches). Thus, upon completion of the association by intelligent configurator 304 of the movant solid shape and first hole 242 of solid rectangular block 240, the intelligent configurator 304 advises general CAD system portion 302 to display the flat head Phillips screw and the solid rectangular block 240 in accordance with the representative data, e.g., in a manner such as that exemplified in FIG. 2B.

In another of its aspects, the intelligent configurator 304 can further configure the representative data of the movant solid shape as a particular procurement item. For example, the intelligent configurator 304 may realize that the movant solid shape can be procured (e.g., purchased or acquired) from multiple vendors, e.g., from Vendor A and Vendor B. But perhaps at the time of creation there are one or more factors which militate in favor of acquiring the part for the movant solid shape from Vendor A rather than Vendor B. For example, perhaps the designer or the designer's employer has a preferential contractual relationship with Vendor A or for some other reason (lower cost) has a policy that favors purchasing from Vendor A rather than other vendors. These factors or considerations can be stored in rule database 308 and consulted by intelligent configurator 304 upon configuring of the movant solid shape.

Figure 3:
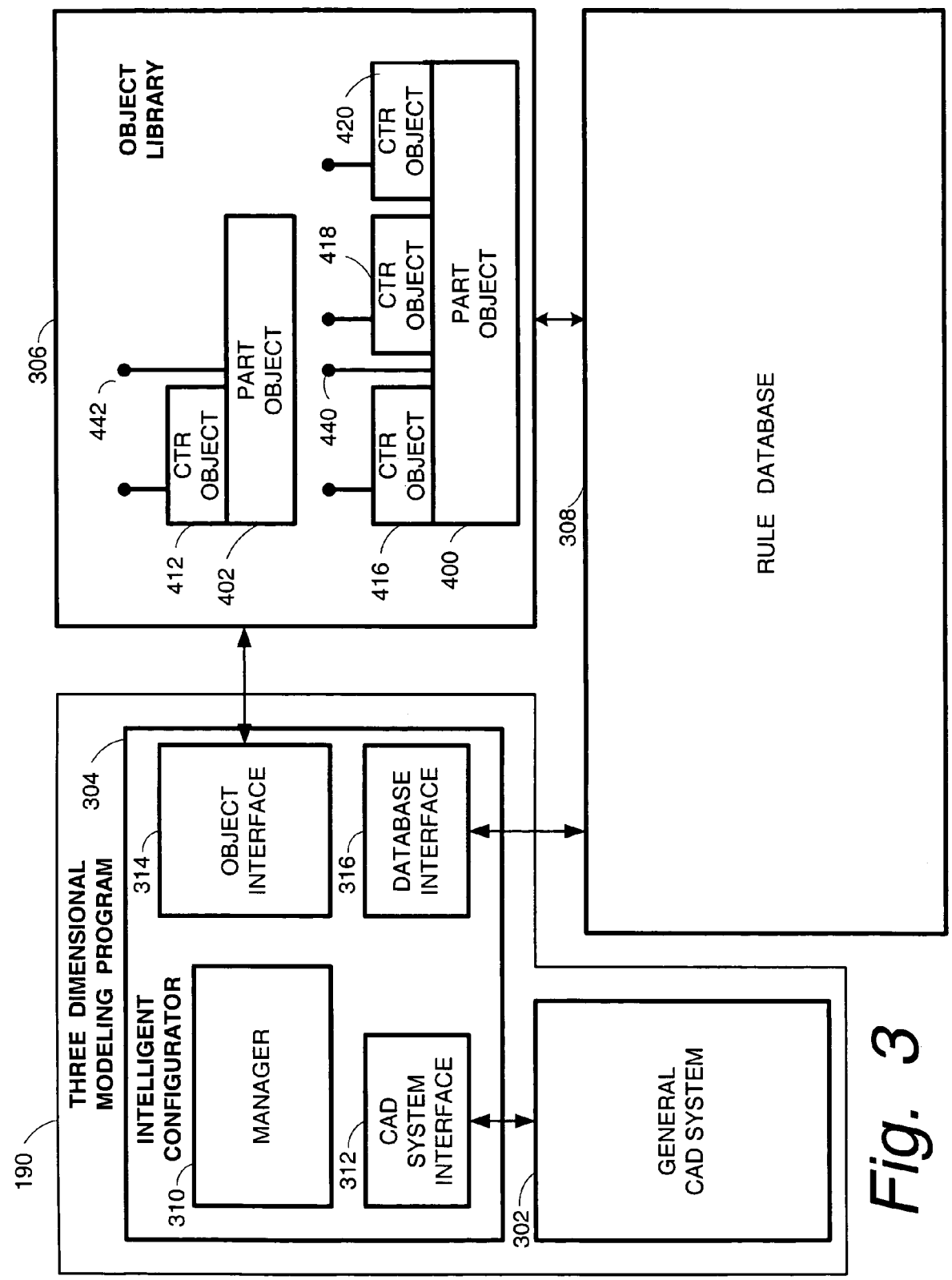
FIG. 3 is a diagrammatic view of basic aspects of an example computer program executed by the example computer graphics workstation.
Figure 3A:
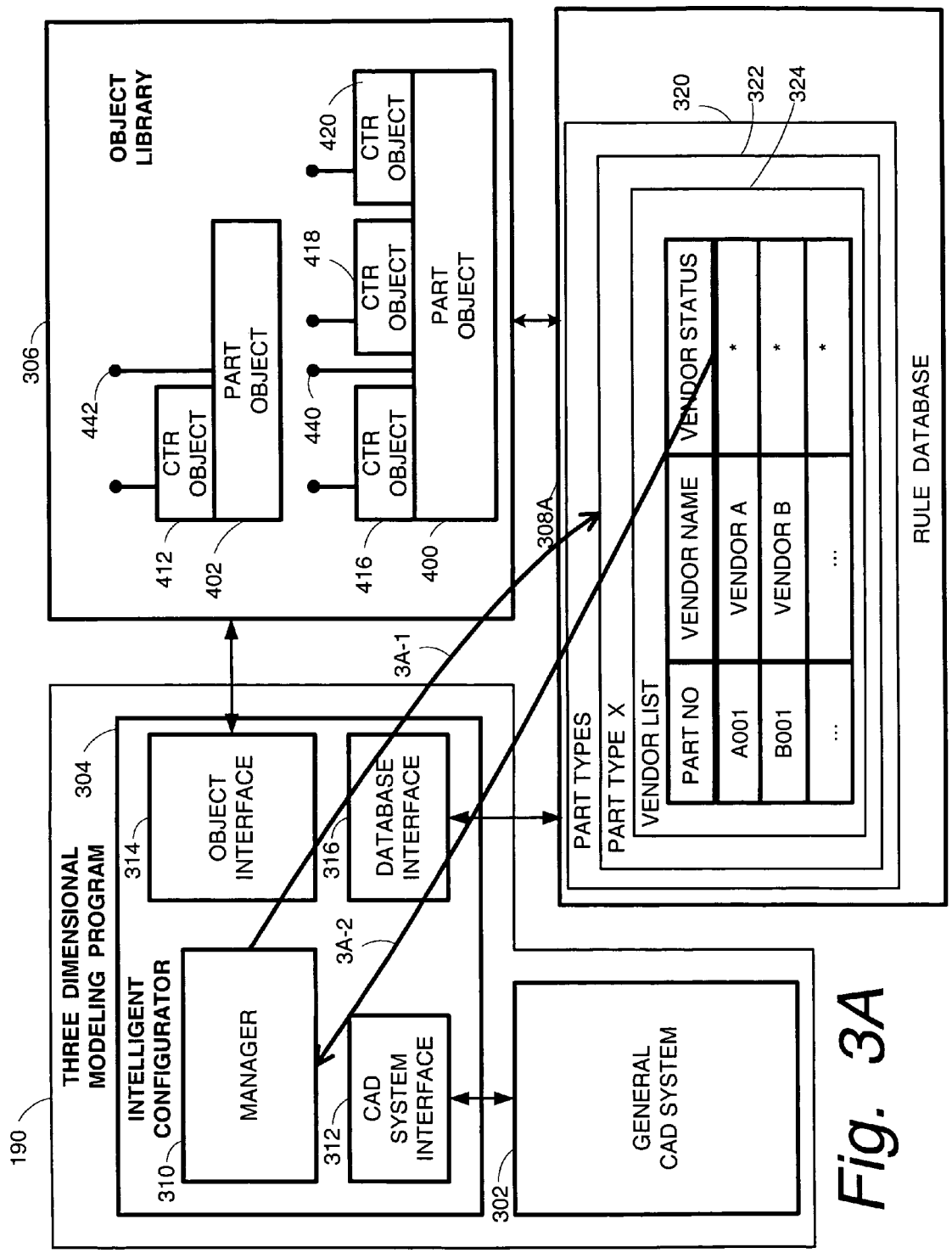
FIG. 3A is a diagrammatic view of an embodiment of the example computer program of FIG. 3 wherein a rule database includes part type information.
Figure 3B:
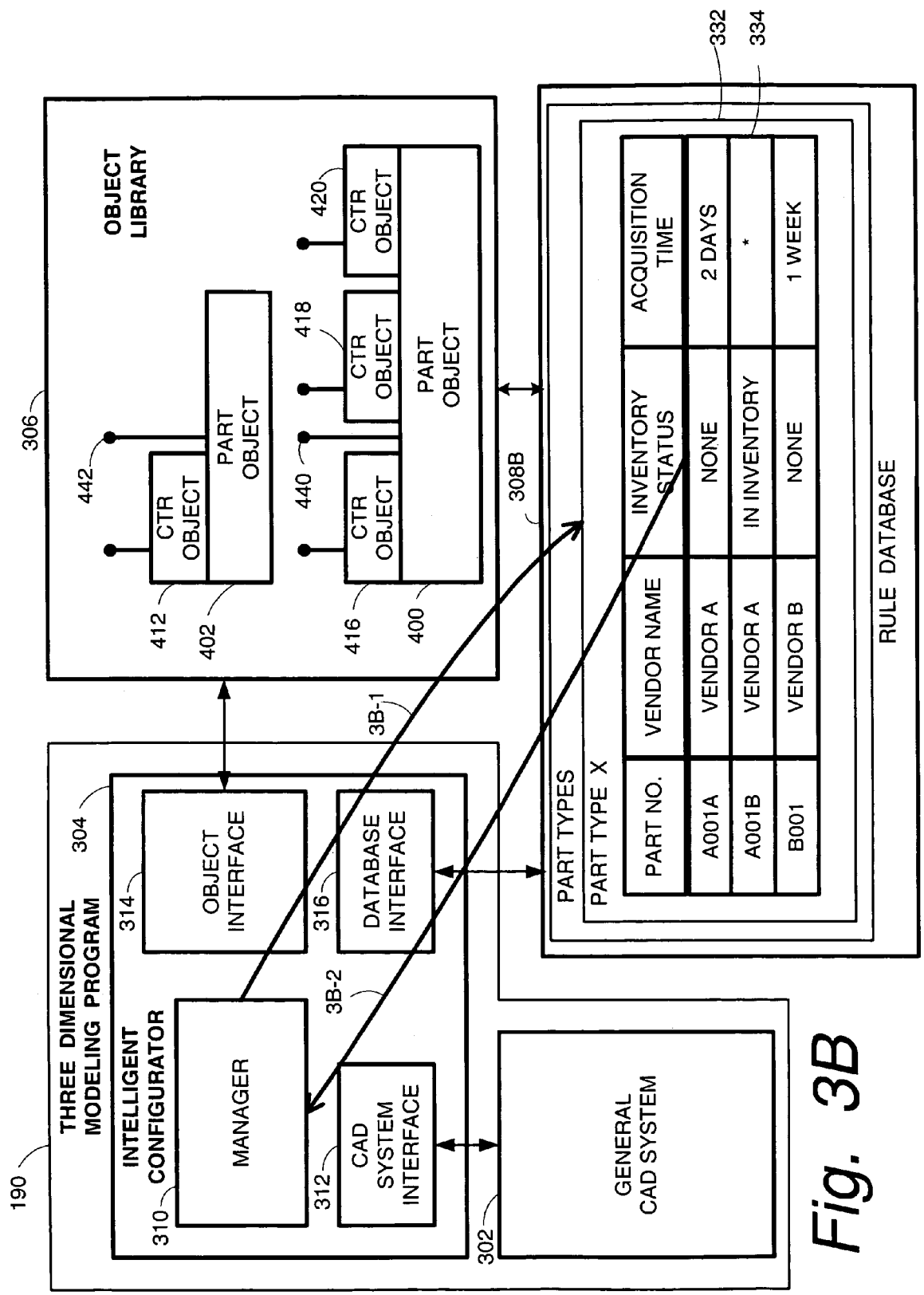
FIG. 3B is a diagrammatic view of an embodiment of the example computer program of FIG. 3 wherein a rule database includes part inventory and/or availability information which is queried by a manager.

FIG. 3A illustrates the representative data of the movant solid shape being configured in accordance with a procurement feature, and particularly a choice of vendor (preferred vendor). FIG. 3A shows as action 3A-1 that, upon insertion of the movant solid shape into the target solid shape, the manager 310 of intelligent configurator 304 queries rule database 308A through database interface 316. In the embodiment shown in FIG. 3B, the rule database 308A includes a part type list 320 which includes an entry for each part type. In FIG. 3B, a part type entry 322 concerns PART TYPE X (which could be, for example, a flat head Phillips screw having a length of two inches and a one half inch diameter). Each part type entry includes or references a vendor list 324. In one example illustration, the vendor list 324 includes a left column which lists a model number, a middle column which lists a vendor identifier, and a right column which indicates vendor status. It will be appreciated that the rule database 308 need not be constructed as a table in this manner, and that other ways of associatively storing this or comparable information can be utilized. In the example shown in FIG. 3B, an asterisk in the right column adjacent Vendor A denotes that Vendor A is a preferred vendor. Other notations may instead be employed in vendor list 324, such as a numerical preference ranking, for example. Action 3A-2 of FIG. 3A shows, for the particular example now discussed, the intelligent configurator 304 receiving back from rule database 308A an indication that part A001 from Vendor A is preferred.

Other examples of configuring the representative data of a movant solid shape based on a rule relating to procurement items also exist. For example, action 3B-1 of FIG. 3B shows intelligent configurator 304 making an inquiry to rule database 308B regarding procurement information in a situation in which multiple parts or models satisfy the part type and size requirements discerned by intelligent configurator 304 and imputed to the movant solid shape upon positioning relative to the target solid shape. For example, the part type entry 332 for PART TYPE X (which could again be, for example, a flat head Phillips screw of specified size) includes a model list 334 which lists, in its first column, model numbers of parts which satisfy the requirements for the movant solid shape as imputed by intelligent configurator 304. For example, the model list 334 includes part numbers A001A and A001B having sizes and geometries suitable for the movant solid shape, both of which are marketed by Vendor A (as indicated by the second column of model list 334). In addition, part number B001 is included in 334 as marketed by Vendor B. Inventory information for the models included in model list 334 is stored in model list 334 as represented by the third column. With the notation adopted in FIG. 3B, the third column for model A001B has an asterisk, which denotes that the designer has this particular model number in current inventory. Other notations or nomenclatures can be utilized to depict inventory status, e.g., numerical rankings for the number of in-inventory parts, etc. In addition, for model numbers not currently in inventory, the model list 334 includes model acquisition time information. For example, the particular model list 334 illustrated in FIG. 3B indicates that the time necessary for the designer time to acquire model A001A from Vendor A is on the order of two days, while the time necessary for the designer time to acquire model B001 from Vendor B is on the order of one week. By querying this information stored in model list 334 of rule database 308B, the intelligent configurator 304 can receive as action 3B-2 information regarding which particular model to use for the movant solid shape, and thereby further configure the representative data of the movant solid shape in accordance with this particular procurement information. Thus, the intelligent configurator 304 queries the rule database 308 to ascertain if there are any inventory or availability factors for configuring the movant solid shape in terms of actual part number.

Those skilled in the art will therefore appreciate that the predetermined rule(s) referenced above may be implemented by using a rule data base such as rule database 308. Moreover, the rule database 308 can either comprise or operating in conjunction with an enterprise resource planning (ERP) system owned by or available to the designer. An examples of enterprise resource planning (ERP) system is disclosed in U.S. patent application Ser. No. 09/888,372 filed Jun. 2, 2001 and corresponding United States Patent Publication US 2002/0052807 A1, both of which are entitled "Network Architecture-Based Design-To-Order System and Method" and both of which are incorporated by reference herein in their entirety.

Figure 3C:
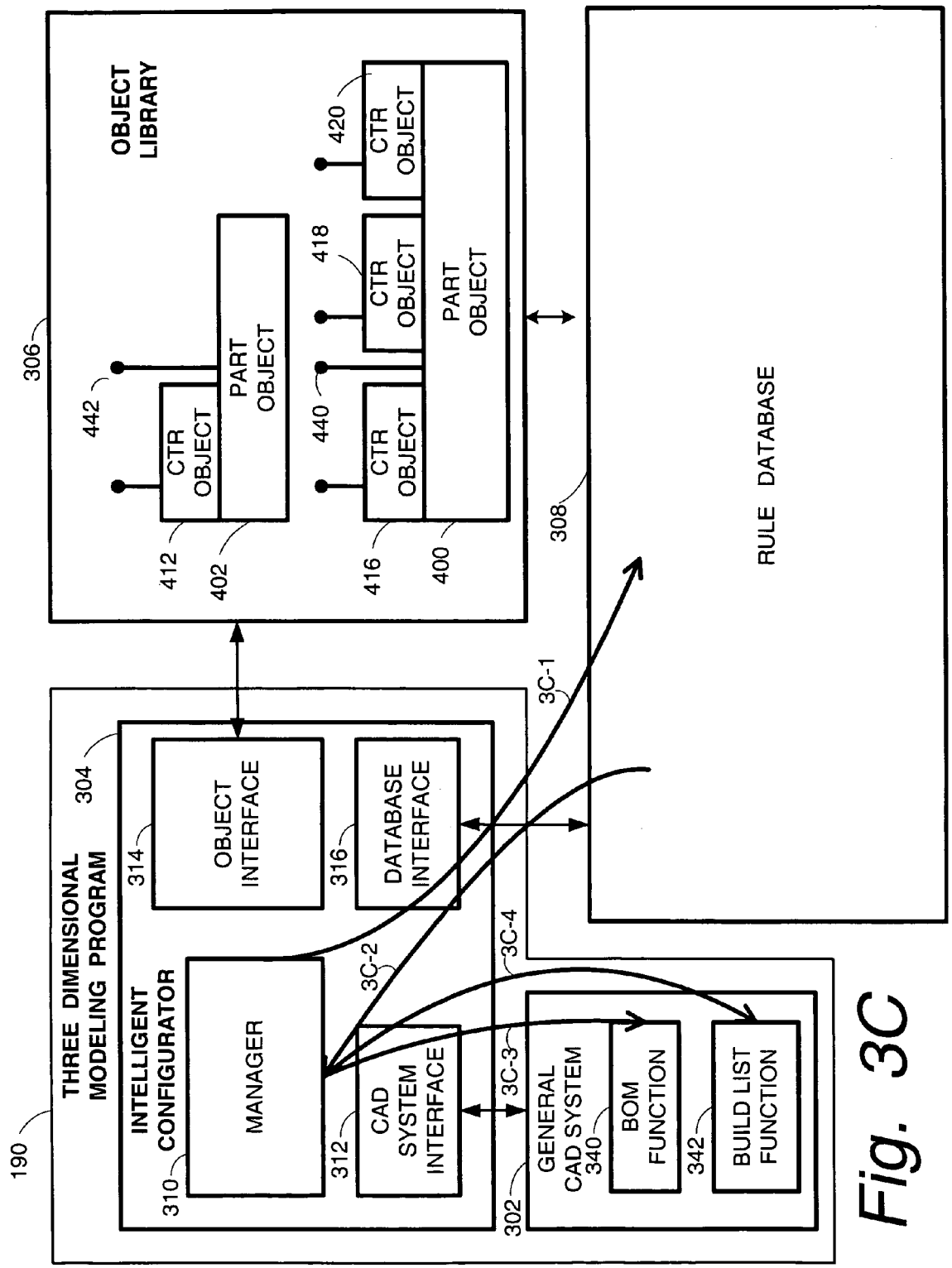
FIG. 3C is a diagrammatic view of an embodiment of the example computer program of FIG. 3 which constructs a bill of materials and/or a build list.

As an optional feature illustrated in FIG. 3C, the intelligent configurator 304 can, as indicated by action 3C-3, instruct a bill of materials function 340 included in general CAD system portion 302 to include the model number of the part which is to be procured in the bill of materials (BOM) being complied for the assembly. As an additional optional feature, as action 3C-4 the intelligent configurator 304 can instruct a build list function 342 included in general CAD system portion 302 to include the part from Vendor A in a build list being complied for the assembly. Those skilled in the art appreciate that a build list is a step-by-step instruction set which briefly explains how and in what order the parts of the assembly are to be connected together to form the overall assembly. Of course, the information supplied by intelligent configurator 304 to the bill of materials function 340 and build list function 342 is obtained from, e.g., the rule database 308 in the manner above discussed and represented by a query action 3C-1 and a response action 3C-2.

It should be understood that the configuring of a solid shape as described herein includes configuring certain representative data of the solid shape. The representative data of the solid shape is stored in a memory and associated with the solid shape, and is utilized by a program such as a CAD program or other graphics program to generate a display of the solid shape on a display device such as display device 158. Reference herein to configuring or otherwise affecting a solid shape or part should be understood to configuring or affecting the representative data of the solid shape or part.

Figure 2B:
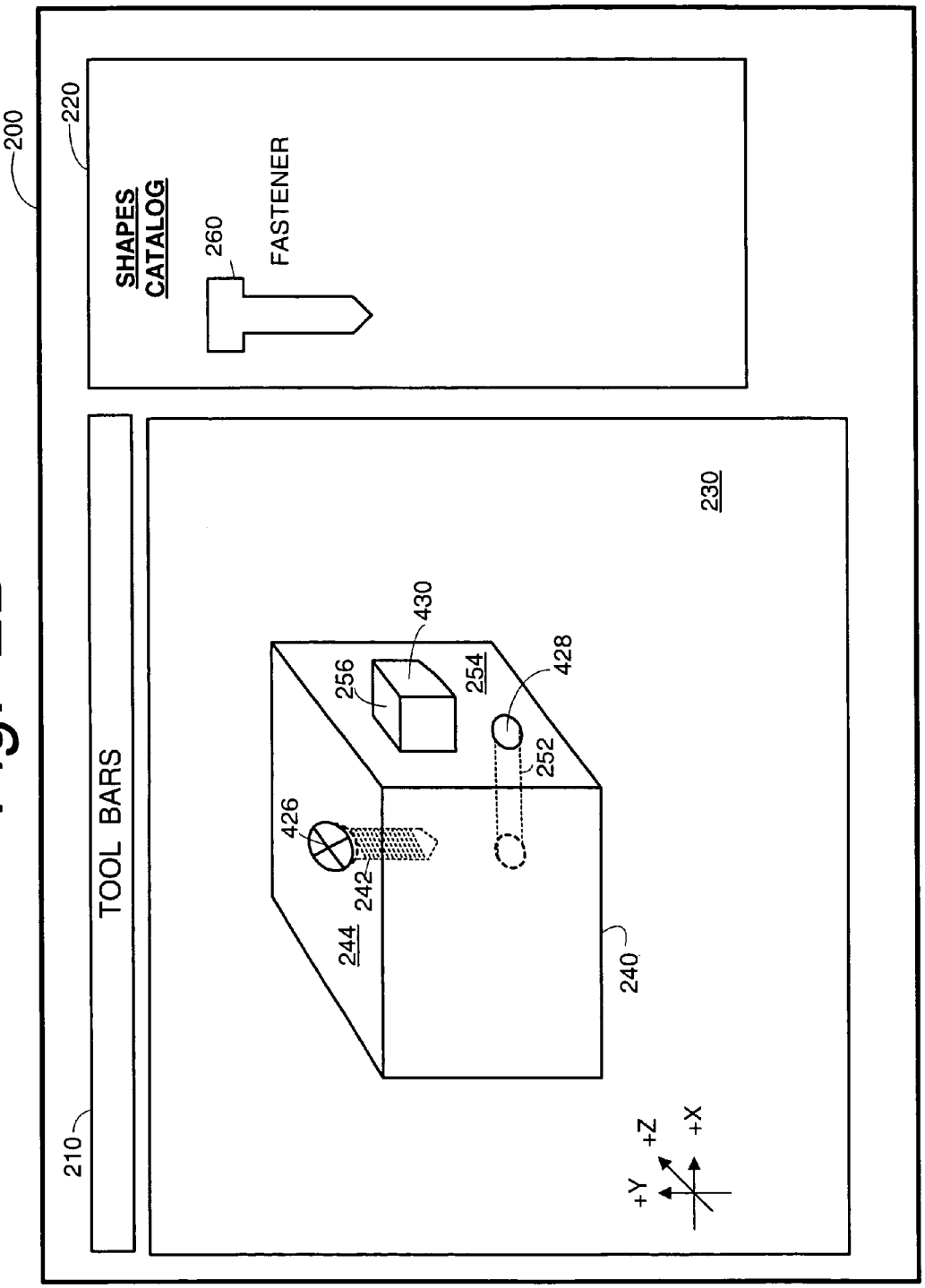
FIG. 2B is a diagrammatic view depicting example contents of a screen of the display device of FIG. 2A after the movant solid shape has been inserted into the assembly and automatically configured.

One non-limiting example implementation of intelligent configurator 304 utilizes Component Object Modeling (COM) objects for storing, e.g., representative data of the respective solids shapes. In this implementation, each solid shape (i.e., part) included in the assembly has a corresponding COM object (hereinafter simply referred to as an "object"). For example, the target solid shape of FIG. 2A (which is solid rectangular block 240) has object 400 and the movant solid shape has object 402. Part objects are designed and created using either Visual Basic™ language of Microsoft Corporation or any other programming language. The object 402 is instantiated as a persistent instance of the generic fastener when the designer clicks on the generic fastener depicted by icon 260. Both object 400 for solid rectangular block 240 and object 402 for the flat head Phillips screw are stored in object library 306, as shown in FIG. 3. It will be appreciate that, for more complex assemblies, the object library will include many more objects including objects for each of the solid parts involved in the assembly.

In the example implementation, configuration of the movant solid shape, and in some situations the target solid shape, is facilitated by the program further allocating one or more connector objects for each of plural solid shapes. Each connector object is conceptually associated with a physical location on the respective solid shape. Each connector object includes configuration information pertaining to how the representative data of its solid shape is to be configured relative to another solid shape. For solid shapes selected from object library 306, certain default connector object(s) accompany the part object for the solid shape. Connector object(s) may also be added to solid shapes already included in the assembly. Thus, a part object may have more than one connector objects.

In the example of FIG. 2A, the movant solid shape which will become the flat head Phillips screw has connector object 412. The connector object 412 is associated with a physical location on the fastener, such physical location being the center of the head, depicted as point 414 in FIG. 2A. The solid rectangular block 240 has three connector objects thus far formed, including a connector object 416 for first hole 242 of solid rectangular block 240; a connector object 418 for second hole 252 of solid rectangular block 240; and, a connector object 420 for boss 256 of solid rectangular block 240. The connector object 416 for first hole 242 of solid rectangular block 240 is associated with a physical location depicted as 426 which is the center of the mouth of first hole 242. The connector object 418 for second hole 252 of solid rectangular block 240 is associated with a physical location depicted as 428 which is the center of the mouth of second hole 252. The connector object 420 for boss 256 of solid rectangular block 240 is associated with a physical location depicted as 430 which is the center of the right most surface (in the Y-Z plane) of boss 256.

In FIG. 3 the connector object 412 is shown as an adjunct to part object 402 for the flat head Phillips screw in object library 306, while connector objects 416, 418, and 420 are shown as adjuncts to part object 400 for solid rectangular block 240. Each part object, including object 400 for solid rectangular block 240 and object 402 for the flat head Phillips screw, has an interface through which other operations can occur, including addition of further connector objects. In this regard, FIG. 3 illustrates object 400 for solid rectangular block 240 as having interface 440 and object 402 for the flat head Phillips screw as having interface 442. Similarly, each connector object has an interface (which is similarly pictured as the interfaces 440, 442 but unlabeled in FIG. 3) through which data and/or new rules can be added to the connector object, such addition being possible either at run time or at creation time.

Figures 4, 5:
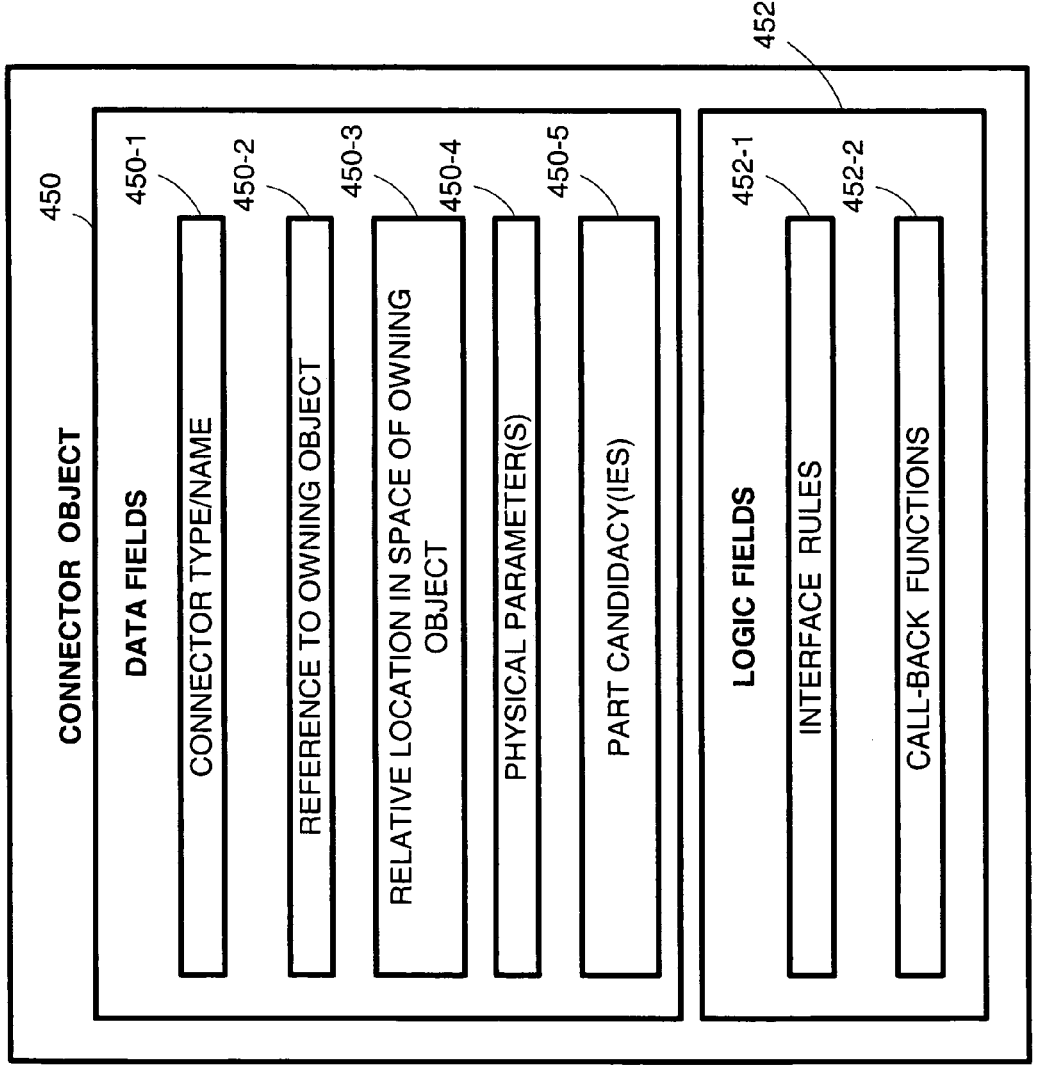
FIG. 4 is a diagrammatic view of an example connector object utilized the computer program of FIG. 3.
FIG. 5 is a diagrammatic view showing interrelationships of FIG. 5A, FIG. 5B, FIG. 5C, and FIG. 5D.
Figure 5B:
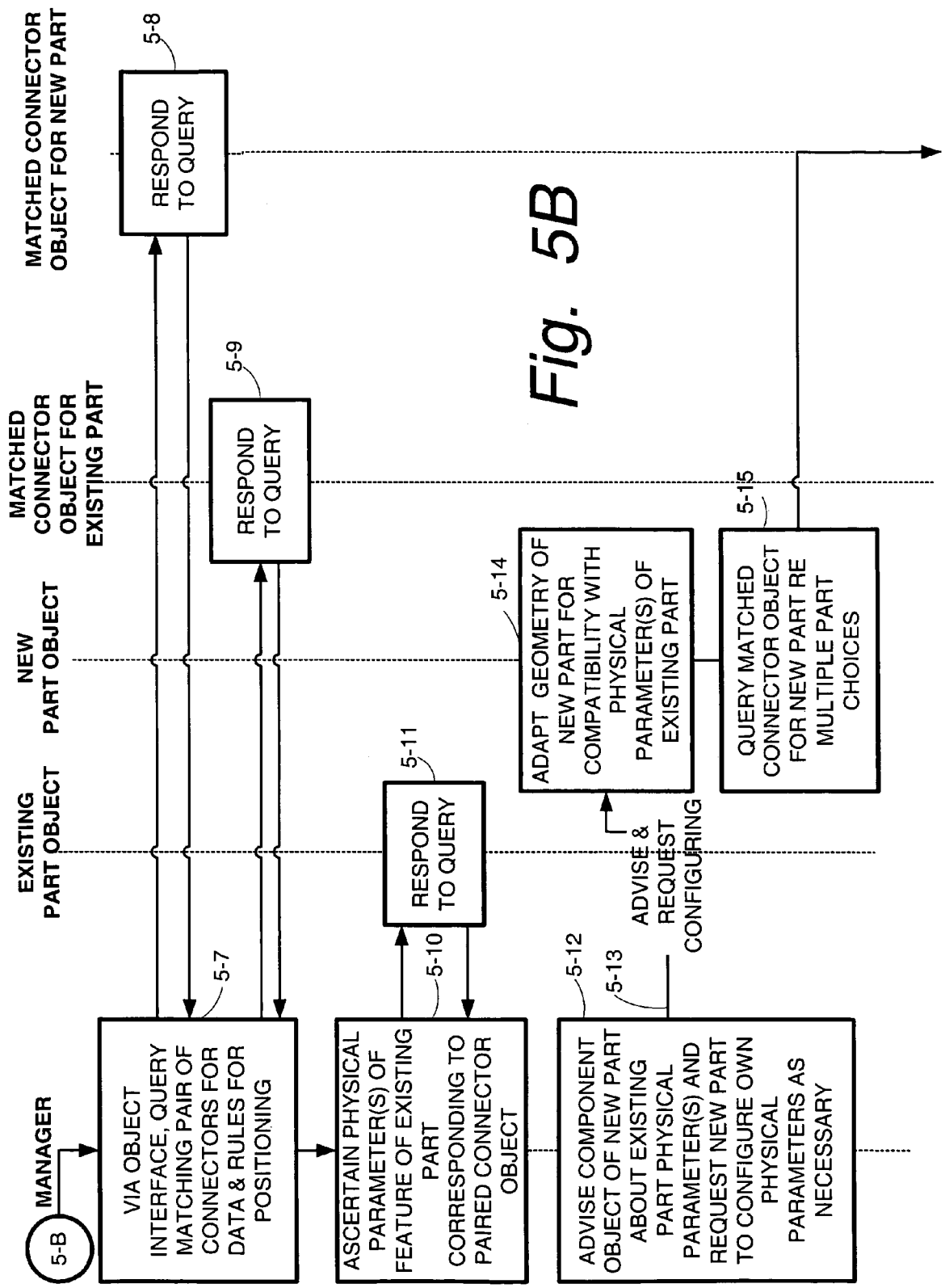
Figure 5C:
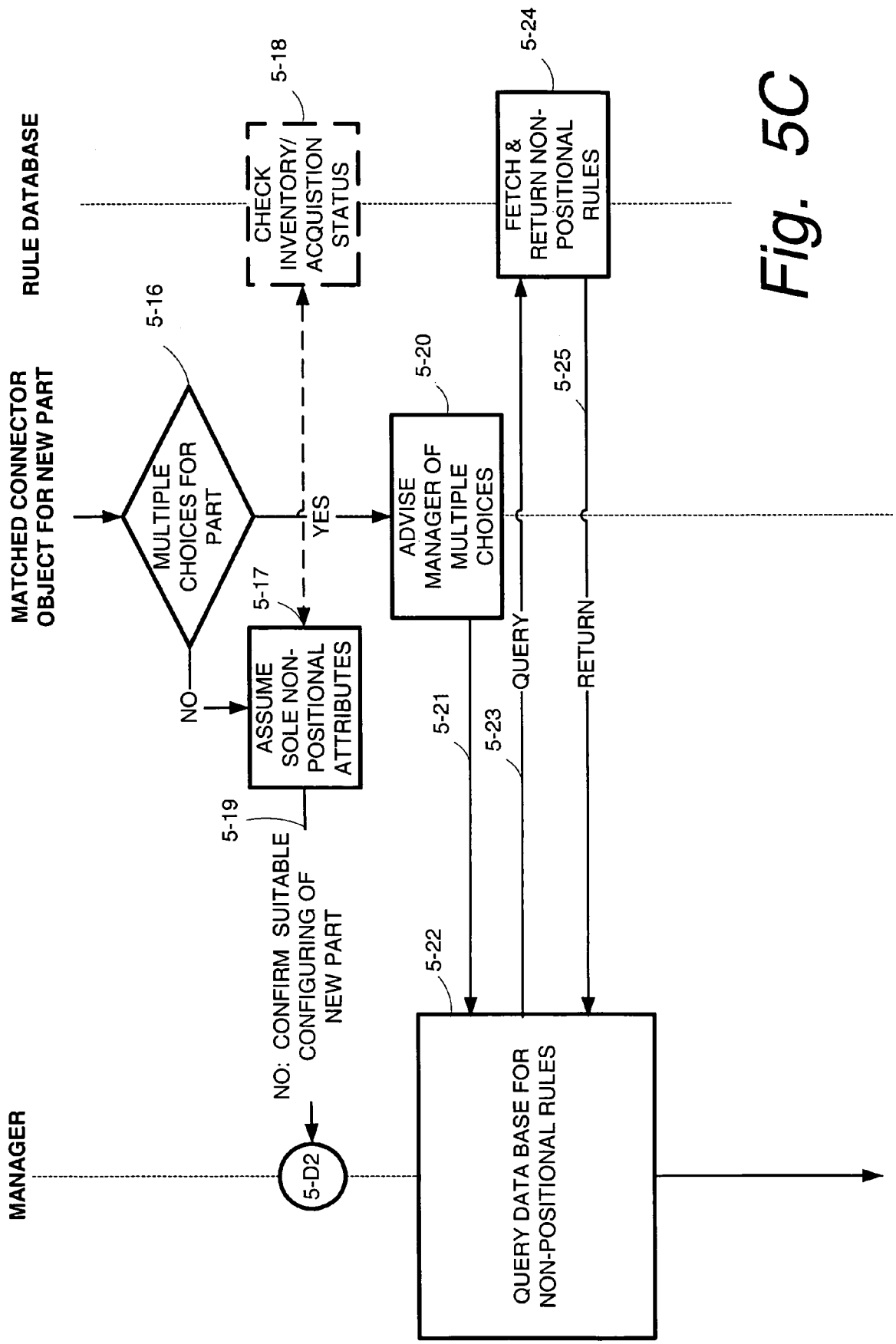

Like other objects, the connector objects include executable code and a data structure. FIG. 4 shows a non-limiting, representative example arrangement of data fields 450 and logic fields 452 in a generic connector object. A first example data field 450-1 is a connector type/name field. A second example data field 450-2 contains a reference to an owning part, which field can be filled when a generic connector object is associated with a solid shape. In the example of FIG. 2A, therefore, an identification of the fastener solid shape part 402 would be supplied as the owning part for field 450-2 for the connector object 412. A third example data field 450-3 contains a description of a relative location 414 in local space of the owning part 402. A fourth example data field is a physical parameter(s) data field 450-4 which can eventually store, e.g., dimensional and sizing information of the feature expressed by the connector object for its solid part, once such information is imputed by intelligent configurator 304. A fifth example data field is a part candidacy field 450-5 which can include information concerning or pointers to one or more pieces of information defining or relating to potential parts which are considered candidates for the movant solid shape. It will be appreciated that the list of data fields thus far provided is not exhaustive, and that additional or alternative data fields can be provided.

The logic fields 452 of the generic connector object include both interface rules 452-1 and call-back functionality 452-2. Typically the interface rules 452-1 store interface rules, but the interface rules can also include code which is executed to apply such rules. The call-back functionality is utilized when a connector object is empowered to contact rule database 308 for ascertain predetermined rule(s) to which it is subject.

FIG. 5A-FIG. 5D illustrate basic, example steps or actions which are preformed by intelligent configurator 304 in conjunction with configuring a movant solid shape which is being added to an assembly. Such example steps or actions are discussed below in a non-limiting manner in conjunction with the scenario of FIG. 2A in which a movant solid shape, upon insertion into the assembly and mating with the target solid shape of solid rectangular block 240, eventually takes the form of flat head Phillips screw. It will be appreciate that in other modes the same results can be achieved using different steps and/or, in some instances, a different ordering of steps.

In the example scenario, a fastener part object is instantiated by clicking on fastener icon 260 in shapes catalog 220 through action of general CAD system 302. A graphically depicted solid shape in the form of a generic fastener is dropped or dragged into the scene or assembly comprising the target solid shape, i.e., solid rectangular block 240. Upon the dropping or dragging of the graphical depiction of the generic fastener solid shape near solid rectangular block 240, the CAD system 302 notifies manager 310 of intelligent configurator 304. Action 5-1 of thus shows manager 310 receiving notification from CAD system 302 that a new part or movant solid shape (e.g., the graphical depiction of a generic fastener) has been dropped or dragged onto or proximate a target solid shape (e.g., solid rectangular block 240).

Upon receiving the notification of action 5-1, as action 5-2 the manager 310 queries the new part for a listing of connector objects for the new part. In the example scenario, manager 310 queries object 402 for the generic fastener part for a listing of its connector objects. The query of this and other objects in object library 306 is performed via object interface 314. Upon receiving such query, as action 5-3 the part object for the generic fastener part responds with a listing of its connector objects. As understood from FIG. 3, the part object 402 for generic fastener has only one connector object (connector object 412), and as action 5-3 advises manager 310 accordingly.

Similarly, as action 5-4, manager 310 queries the existing part (i.e., the target solid shape) for a listing of connector objects for the existing part. In the example scenario, manager 310 queries object 400 for the solid rectangular block 240 for a listing of its connector objects. Upon receiving such query, as action 5-5 the part object 400 for solid rectangular block 240 responds with a listing of its connector objects. Such listing includes connector object 416 for first hole 242 of solid rectangular block 240; connector object 418 for second hole 252 of solid rectangular block 240; and connector object 420 for boss 256 of solid rectangular block 240 (see FIG. 3).

Having now received connector object information from both the movant solid shape (the generic fastener) and the target solid shape (solid rectangular block 240), as action 5-6 the manager 310 finds a matching pair of connector objects for the new part and the existing part. In other words, as action 5-6 the manager 310 matches the connector object 412 associated with the generic fastener part object 402 with an appropriate connector object associated with object 400 for solid rectangular block 240.

The matching of connector object pairs which occurs as action 5-6 is preferably performed by examining the connector type or connector name information stored in the connector objects, e.g., in data field 450-1 (see FIG. 4) for each connector object of the two involved solid shape parts. Assume, for example, that connector object 412 associated with the generic fastener, and particularly associated with physical location point 414 which is the center of the head of the fastener, has the name "fastener_hole_top_male". Further assume that: (1) connector object 416 for first hole 242 of solid rectangular block 240 (associated with physical location 426 at the center of the mouth of first hole 242) has the name "fastener_hole_top_female"; (2) connector object 418 for second hole 252 of solid rectangular block 240 (associated with physical location 428 at the center of the mouth of second hole 252) has the name "fastener-hole_top_female"; and (3) connector object 420 for boss 256 of solid rectangular block 240 (associated with physical point 430) has the name "boss_top_male". Given such names for the connector objects for solid rectangular block 240, at action 5-6 logic of the manager 310 would realize that there are two candidate connector objects belonging to solid rectangular block 240 which could be matched or mated with the connector object 412 which is associated with the generic fastener. In particular, on the basis of the connector object names the manager 310 would recognize either connector object 416 for first hole 242 or connector object 418 for second hole 252 would be suitable matching connector objects for connector object 412.

In such case, when manager 310 of intelligent configurator 304 determines that plural connector objects of the target solid shape can be paired with the connector object for the movant solid shape, as optional action 5-6A the program can invoke a predetermined rule for choosing one of the plural connector objects of the target solid shape to be paired with the connector object for the movant shape.

For example, the predetermined rule may require that manager 310 choose, from the plural connector objects of the target solid shape, a connector object having an associated physical location which, judging from its representative data, will be depicted on the display device as being nearest a physical drop location of the connector object of the movant solid shape. In the example of FIG. 2A, the manager 310 would know from CAD system 302 that the solid shape for the generic fastener is dropped or currently positioned over top surface 244 and thus closer to first hole location 426 than to 428. Accordingly, in this situation the manager 310 would match or pair connector object 412 of the generic fastener part object with connector object 416 for first hole 242 of solid rectangular block 240. Thus, as above described, the manager 310 has determined an affinity of a connector object of a movant solid shape and a connector object of the target solid shape.

As below described, in preparing to display the movant solid shape and the target solid shape relative to one another on the display device, the program automatically configures one of the movant solid shape and the target solid shape in accordance with the configuration information of at least one of the respective connector objects. The configuration information can, additionally or alternatively, include one or more of the following: geometry dependency information (which enables the program to determine at least one physical parameter of one of the target solid shape and the movant solid shape); positional information (which can be utilized by the program to determine how the target solid shape and the movant solid shape are to be oriented relative to one another at the physical locations associated with paired connector objects); and, procurement information (which enables the program to determine a procurement item for the movant solid shape). In terms of procurement information utilized for configuring the solid shape, the program can determines a preferred procurement item for the movant solid shape based on predetermined criteria. Examples of such predetermined criteria include vendor preference, and/or inventory or availability as above described with reference to FIG. 3A and FIG. 3B.

As action 5-7, manager 310 queries the pair of connector objects which were matched at action 5-6 in order to obtain information contained in those connector objects for positioning the respective solids shapes relative to one another in the assembly. As previously understood with respect to FIG. 4, such positioning information may be obtained from one or more data fields 450 or logic fields 452 (e.g., interface rules) of the connector objects. For example, the positioning information may require that the physical locations or points corresponding to the respective connector objects be exactly aligned or coincident. Alternatively, the positional information may require that the positional relationship of the two solid shapes be otherwise. For example, one of the physical location associated with one of the connector objects may be spaced away from the physical location associated with the other of the connector objects by a specified amount or interval. The positional information requested at action 5-7 may require that an axis or surface of one of the solid shapes assume a particular orientation (tangent, orthogonal, inclined at a specified angle) relative to an axis or surface of the other solid shape.

In response to the inquiry of action 5-7, the two matched connector objects associated of the two involved part objects fetch the appropriate information from their data fields 450 and/or logic fields 452, and supply the requested information to manager 310. Specifically, as action 5-8 the connector object 412 of generic fastener part responds with its information to manager 310, and as action 5-9 the connector object 416 for first hole 242 of solid rectangular block 240 responds with its information to manager 310. In this simplified example situation, the positional information indicates that the point 414 at the center of the head of the generic fastener solid shape is to coincide with point 426 at the top center of first hole 242, so that the positional relationship will be essentially as shown in FIG. 2B.

As action 5-10, manager 310 ascertains the pertinent physical parameters of the feature on the target solid shape (existing part) which corresponds to the connector object which was matched at action 5-6. Such physical parameters can include, for example, one or more physical dimensions of the feature. The physical parameters can be stored in an object for or associated with the existing part in a data field such as physical parameter(s) data field 450-4. In the situation of FIG. 2A, for example, at action 5-10 manager 310 ascertains the pertinent physical parameters of the first hole 242 of solid rectangular block 240 from its part object 400. In particular, in the example situation of FIG. 2A the manager 310 as action 5-10 queries the part object 400 for the pertinent physical parameters. The part object 400 responds to the query as action 5-11 with the appropriate information (e.g., that the first hole 242 has a diameter of one half inch and a length (e.g., depth) of two inches).

As action 5-12 the manager 310 advises the part object of the new part (e.g., of the movant solid shape) about the physical parameters of the features of the existing part which are pertinent to the mating or pairing of the two parts. Further, in conjunction with action 5-12 the manager 310 requests that the new part object configure its own physical parameters as necessary for the mating with the existing part. Action 5-13 depicts transmission of such an advisement/request message or signal from manager 310 via part/connector interface 314 to the part object 402 of the new part.

In response to the message of action 5-13, as action 5-14 the part object 402 for the new part adapts it's part geometry to be compatible with the physical parameters of the existing part. Thus, in the situation of FIG. 2A, at action 5-14 the part object 402 realizes that its part will have a length of two inches and a diameter of one half inch, and stores such information in its physical parameter data field 450-4.

After receiving its physical feature(s), e.g., size and dimensions, as action 5-15 the part object for the new part queries the matched connector object for the new part to ascertain whether there are multiple candidates for the type or part model that its part could assume. Then, as action 5-16 the matching connector object for the new part checks to determine whether the part which it comprises could be configured with multiple non-positional properties. In other words, the connector object for the new part checks to see whether there are multiple candidates for the type or part model that its part could assume. For example, in the situation of FIG. 2A thus far the connector object for the new part (a generic fastener solid shape) knows its position (from action 5-7) and its physical parameter(s), e.g., size/dimensions (from action 5-12), but does not yet know what type of fastener (e.g., nail, screw, brad, or other connector) its part will be. Nor does the connector object know from which vendor its part is to be acquired, nor the part model number. In order to ascertain whether there are such multiple candidacies, at action 5-16 the connector object for the new part checks its part candidacy field 450-5 (see FIG. 4). The part candidacy field 450-5 may contain either a flag or symbol to indicate there are multiple candidates, or may even contain identities of one or more candidates.

Figure 3D:
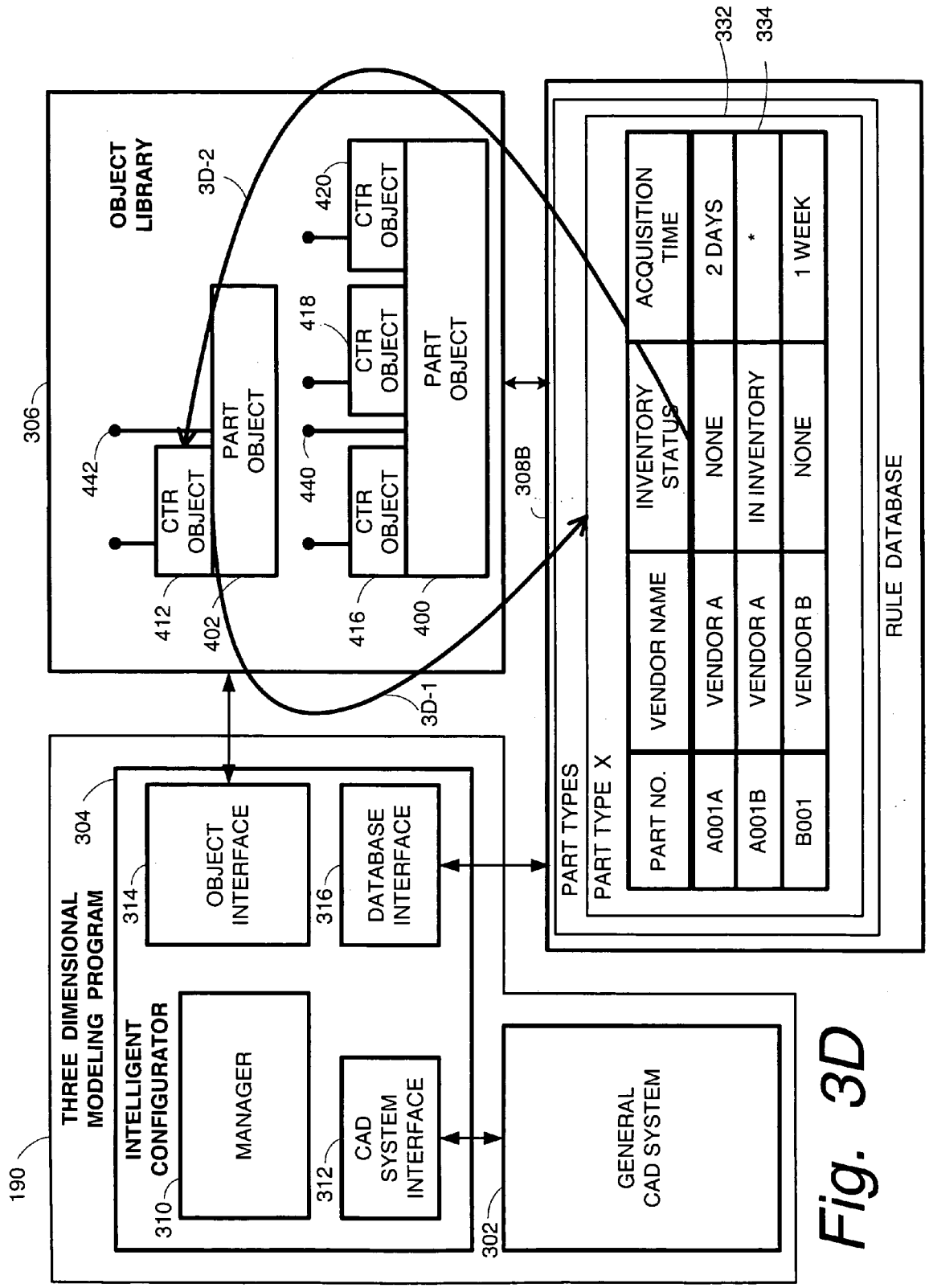
FIG. 3D is a diagrammatic view of an embodiment of the computer program of FIG. 3 wherein a rule database includes part inventory and/or availability information which is queried by a connector object.

If the part candidacy field 450-5 indicates that plural candidacy is not involved for the new part, as action 5-17 the connector object for the new part obtains from, an appropriate data field, the non-positional identity information for the new part, and configures its part accordingly. Such non-positional identity information can comprise the part type (e.g., flat head Phillips screw) and (optionally) a specific vendor. As an optional procedure (indicated by action 5-18), the connector object for the new part can check with rule database 308 to ascertain the inventory/acquisition status of the new part. FIG. 3D illustrates (as an example of such a check) actions 3D-1 and 3D-2, which actions are understood with reference to analogous actions 3B-1 and 3B-2 of FIG. 3B (the actions 3B-1 and 3B-2 of FIG. 3B instead being performed by manager 310 rather than by the connector object of the new part). Whether or not optional action 5-18 is performed, as action 5-19 the connector object for the new part signals the necessary information to manager 310.

In the simple case of sole candidacy, the information so signaled in action 5-19 to manager can include the non-positional identity information for the new part and (optionally) any inventory/acquisition information for the new part. Thereafter, in this simple case the manager 310 continues its actions at action (5-31 on FIG. 5D as represented by the bridging connectors 5-D2). As will be understood in light of subsequent descriptions, the check of the rule database 308 for inventory/acquisition purposes in the simple, one-candidate case can be performed by manager 310 (as understood, e.g., from FIG. 3B) rather than by the connector object for the new part.

In the more complex case wherein it is determined at action 5-16 that there are plural candidates for the new part, as action 5-20 the connector object for the new part so advises the manager 310, and (as indicated by action 5-21) relays any pertinent information gathered, e.g., from its data fields or logic fields, relating to plural candidacy to manager 310. The relaying of this information between manager 310 and connector objects at this point (as at any point in any of the drawings when indicated by arrows between these entities) can be accomplished in any suitable way, such as function call variables, XML or the like, for example. At this juncture, the plural candidacy information relayed from the connector object to the manager 310 can include (for example) one or more of a generic part type or candidate part types, candidate part model numbers, and candidate vendor identities.

Now realizing that there are plural candidates for the part which is being configured for the movant solid shape, as action 5-22 the manager 310 queries rule database 308 to obtain non-positional rules. By "non-positional" is meant rules that pertain to attributes other than size, positional orientation, or position in space. Action 5-23 shows transmission or conveyance of such a query from manager 310 to rule database 308. For example the query of action 5-23 may resemble query 3A-1 of FIG. 3A as including a generic part type. As action 5-24, the rule database 308 uses the generic part type "PART TYPE X" (e.g., fastener: two inches long, one half inch diameter) to access the appropriate part type record, and to fetch or otherwise obtain therefrom the candidate part numbers (e.g., model numbers), vendor name(s), and inventory/acquisition information (as understood, e.g., from FIG. 3B). As action 5-25, the fetched candidate information is sent or otherwise made available to manager 310, much in the manner of action 3B-2. This fetched candidate information is also known as non-positional rule(s) since it relates to non-positional configuration (e.g., part type, part number, vendor identity).

With the data base rules pertaining to the multiple candidate information acquired by the previously described actions now available to manager 310, as action 5-26 the manager 310 determines one or more of the following as necessary or appropriate: part type, part (model) number, part vendor. For example, at action 5-26 the manager 310 may determine (based on the data base rules or even information stored in connector or part object for solid rectangular block 240) that the fastener to be utilized for the fastener depicted by icon 260 in FIG. 2A is to become a flat head Phillips screw, and to have a certain part number and be acquired from a certain vendor. Then, as action 5-27, manager 310 informs the part object for the new part of the decision/determination of action 5-26. Action 5-28 shows manager 310 informing or making the decision/determination result available to the part object for the new part, and action 5-29 involves the part object of the new part storing appropriate data reflective of such decision/determination and (if necessary) reconfiguring or adjusting its part geometry. Thus, in the situation described in FIG. 2A, at action 5-29 that the part object 402 of the new part is directed to have a part type of a flat head Phillips screw, and perhaps imparted other information as well. As action 5-30 the part object for the new part confirms that it has stored the pertinent data resulting from the determination/decision of action 5-26 and has re-configuring its part (if necessary).

At action 5-31 the CAD system 302 is informed of the actual configuring of the new part so that the new part can be more accurately displayed on the display device 150. In the example situation of FIG. 2A and FIG. 2B, at action 5-31 the generic fastener becomes displayed as a flat head Phillips screw in the manner of FIG. 2B.

As action 5-32 and action 5-33, the manager 310 provides information concerning the new part to bill of materials function 340 and 342, respectively. Since action 5-32 and action 5-33 are optional, these actions are represented by broken line symbols in FIG. 5D. When one or both of these optional steps are implemented, this new part information is included as appropriate in either or both of the bill of materials (BOM) and build list, in manner similar to that described previously with reference to FIG. 3C.

It should be understood that, in another implementation for this and other actions, that certain actions performed by a connector object could instead be delegated to or otherwise performed by a part object with which the connector object is associated, and vise versa. For example, for the query of action 5-10 the manager 310 could, instead of inquiring of the part object 400, query the connector object 416 for first hole 242 of solid rectangular block 240. In such other implementation, the connector object 416 would then query the part object 400 with which it is associated.

It will be appreciate that the basic, representative actions described above can be varied and expressed in many different ways, e.g., in order of execution, with different data flow, with structures other than connector objects or the particular connector objects, with different initiating and responding entities. Examples of non-limiting variations are described below in conjunction with the modified implementations of FIG. 6-FIG. 9.

Figure 6:
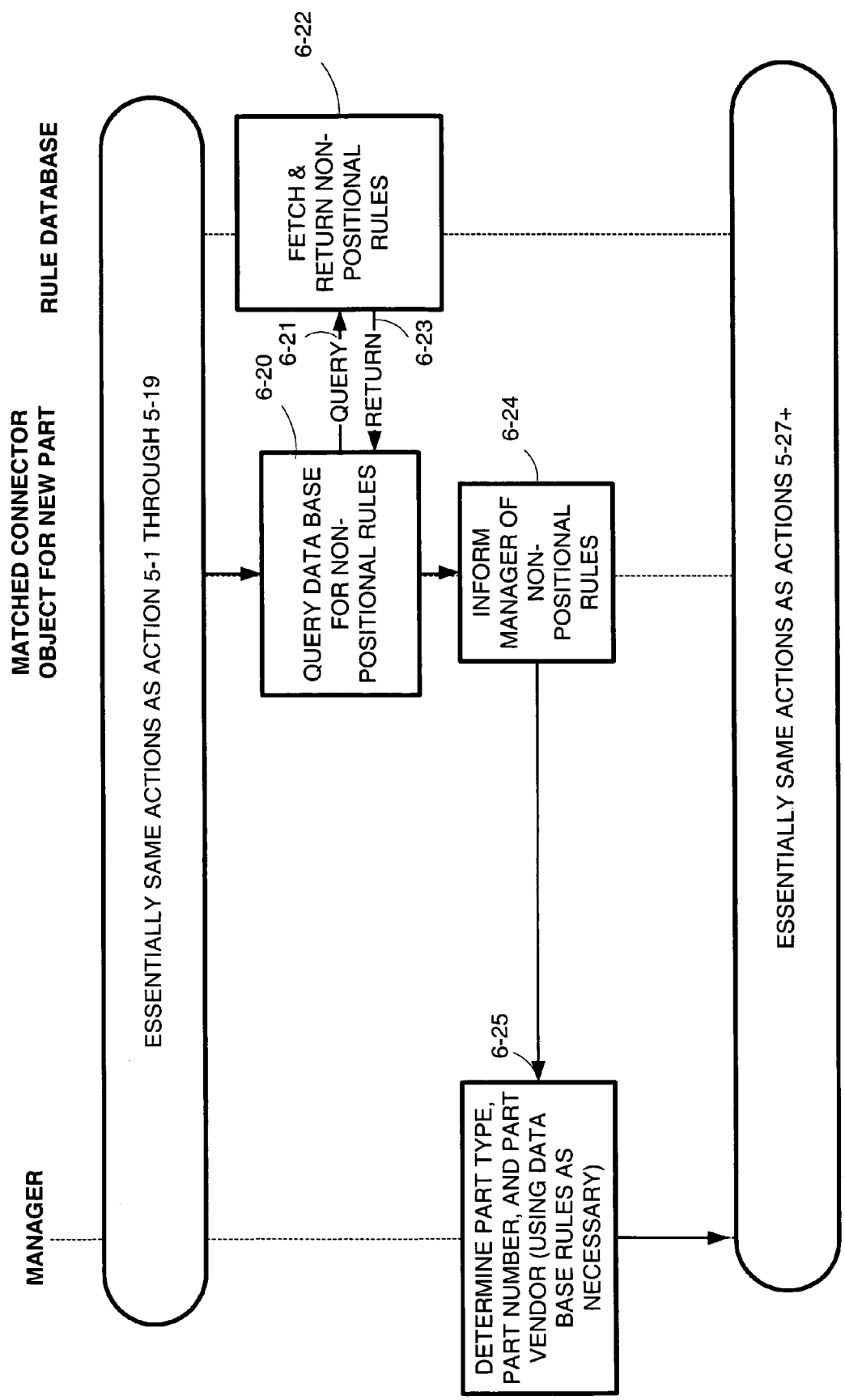
FIG. 6-FIG. 9 are flowcharts showing basic differing actions performed by different example implementations of intelligent configurators portions of the computer program of FIG. 3.

In the modified implementation of FIG. 6, in a multiple candidacy case the connector object for the new part queries the rule database 308 for the non-positional rules. Thus, the modified implementation of FIG. 6 essentially differs from the implementation of FIG. 5, since in the FIG. 5 implementation the manager 310 queries the rule database 308 under such circumstances. The modified implementation of FIG. 6 can thus share actions such as action 5-1 through action 5-19 with the FIG. 5 implementation. But as action 6-20, the connector object for the new part queries rule database 308 much in the same manner as did manager 310 in action 5-22. Action 6-21 shows actual transmission of the query. As action 6-22, the rule database 308 fetches and returns the non-positional rules for the multiple candidacy in essentially the same manner as previously described with respect to action 5-24, but returning the non-positional rules initially to the connector object for the new part as indicated by action 6-23. As action 6-24 the connector object for the new part relays or otherwise makes available the non-positional rules for the multiple candidacy to manager 310. Then, as in like manner as in action 5-26, at action 6-25 the manager 310 makes a determination or decision relating to such non-positional configuration of the new part as part type, part (model) number, and vendor identity. The remaining actions of the FIG. 6 implementation can be similar to action 5-27+ of the FIG. 5 implementation.

Figure 7:
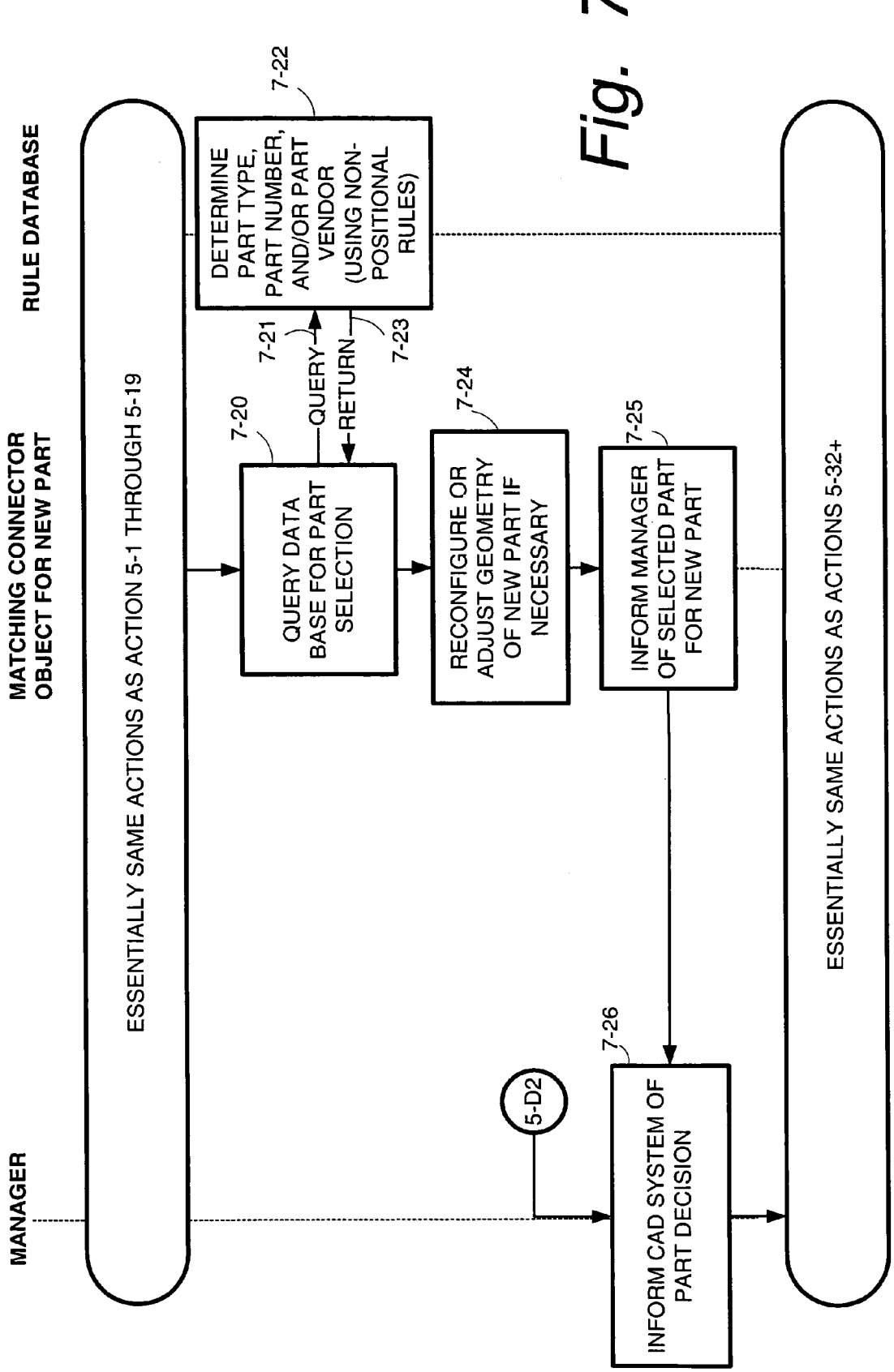

In the modified implementation of FIG. 7 differs from that of FIG. 6 in that the rule database 308, when queried by the connector object for the new part in a multiple candidacy case at action 7-20, not only fetches the multiple candidacy information, but as action 7-22 also makes the determination/decision that had been entrusted to manager 310 in the previously described implementations of FIG. 5 and FIG. 6. Thus, as action 7-23 the rule database 308 returns the determination/decision result to the connector object for the new part. Then, in accordance with this determination/decision result (which can affect part type, part (model) number, and vendor), as action 7-24 the connector object for the new part reconfigures its data or description if necessary (e.g., reconfigure itself to refer to a flat head Phillips screw rather than to a generic fastener). Thereafter as action 7-25 the connector object for the new part informs the manager 310 of the determination/decision and of any reconfiguration, so that (as action 7-25) the manager 310 can inform the CAD system 302 (in like manner as action 5-31) for proper displaying of the new part. Optional actions such as action 5-32 and action 5-33 can also be performed when developing a bill of materials or build list.

Figure 8:
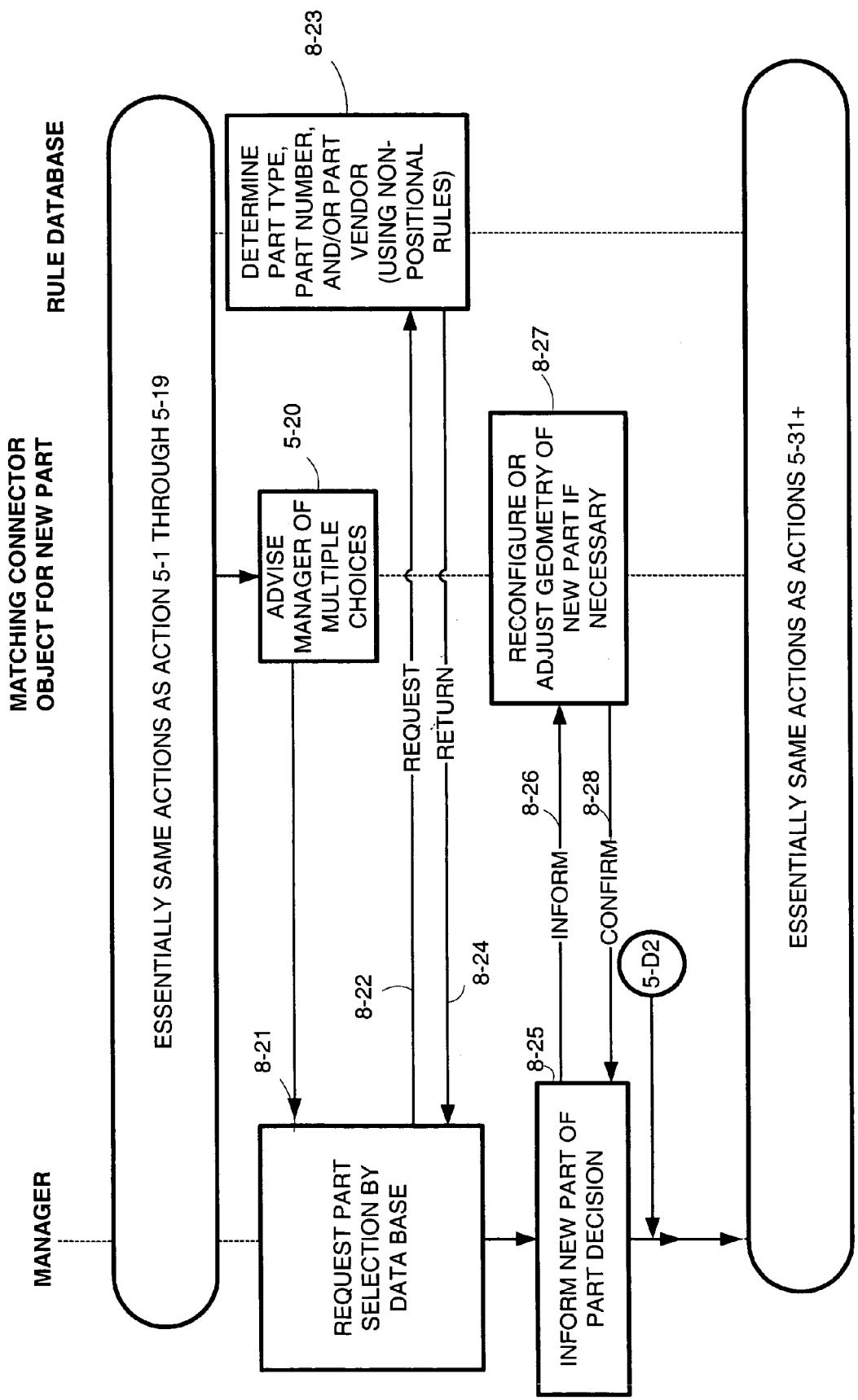

The modified implementation of FIG. 8 resembles that of FIG. 7 in that the rule database 308 again makes the candidacy determination/decision that had been entrusted to manager 310 in the previously described implementations of FIG. 5 and FIG. 6. But the FIG. 8 implementation differs in that the candidacy determination/decision performed by rule database 308 which occurs as action 8-23 is prompted by the manager 310 in a scenario more comparable to that of FIG. 5. That is, as action 8-21 the manager 310 requests the rule database 308 to make a part selection by using logic in the rule database 308 and by operating on the non-positional rules stored in rule database 308. After making the determination/decision of action 8-23, the rule database 308 returns the determination/decision result information essentially directly to manager 310 as indicated by action 8-24. The manager 310 then informs the new part of this decision in action 8-25, so that (reminiscent of action 5-27 through action 5-30) the connector object for the new part can cause a reconfiguring of the new part, if necessary, and confirm the same to manager 310 (action 8-26 through action 8-28). Thereafter subsequent actions such as action 5-31+ can follow.

Figure 5D:
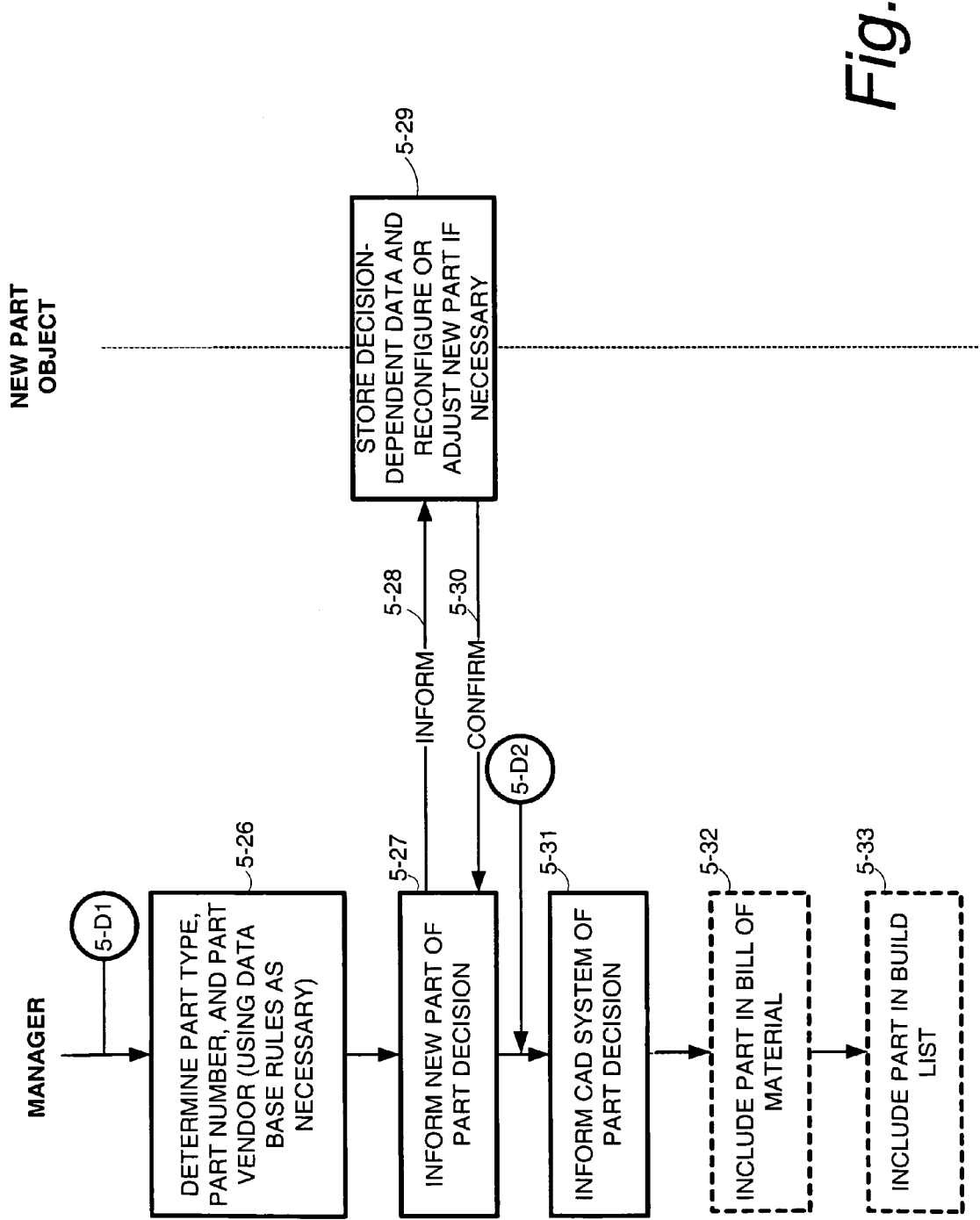
Figure 9:
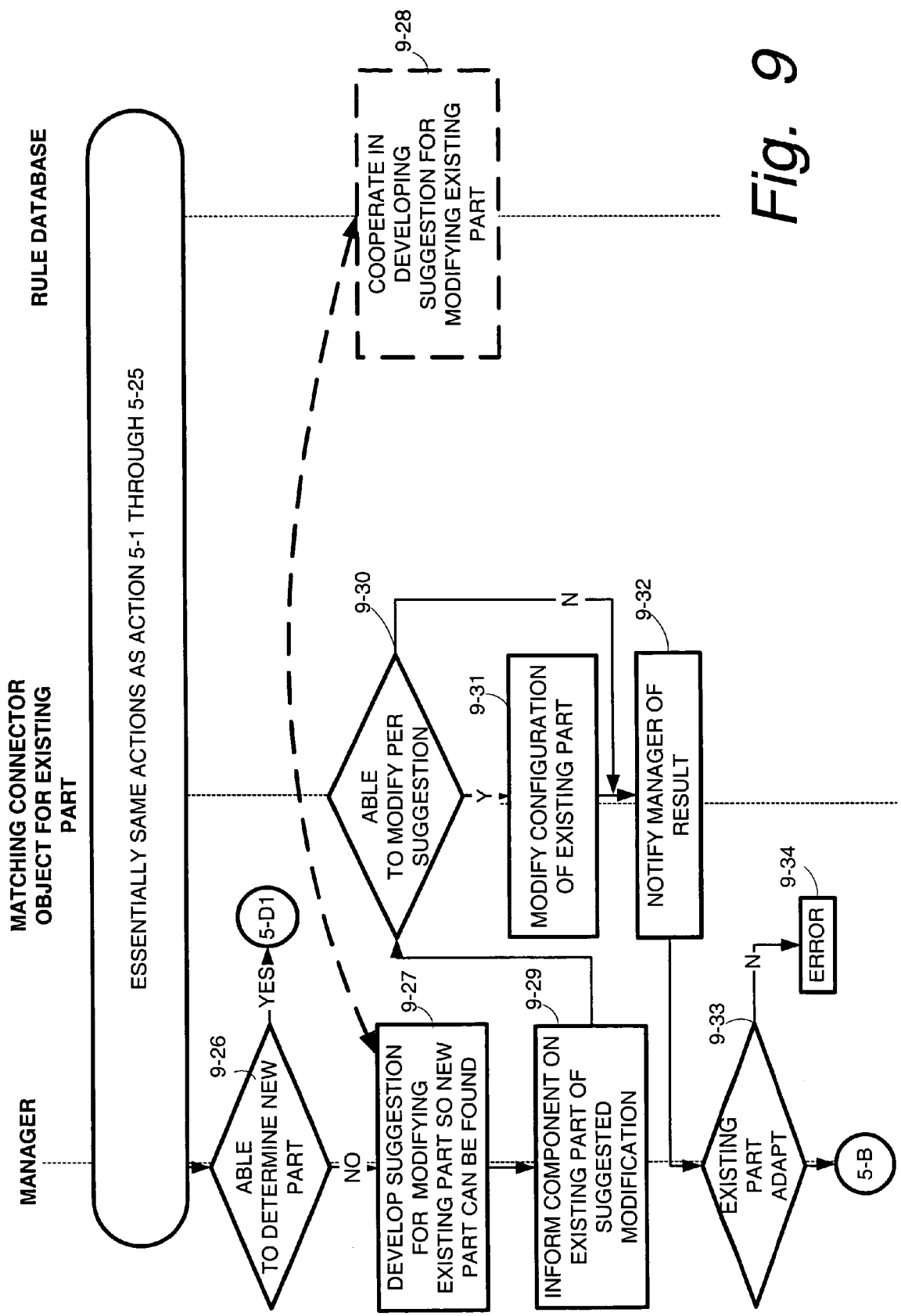

The implementation of FIG. 9 addresses a situation in which the manager 310 is unable to or otherwise refrains from making a determination or decision at action 5-26 regarding the new part. Accordingly, action 9-26 shows manager 310 checking whether it can make such a determination or decision. Should the manager 310 be able at action 9-26 to make a decision for selecting particularities for the new part (e.g., part number, vendor, etc.), then normal execution in the manner of the FIG. 5 implementation continues as indicated by connector 5-D1 (so that the next action performed is action 5-26, as shown in FIG. 5D).

Thus, it may occur that the manager 310 is not able at action 9-26 to make a decision for selecting particularities for the new part. Such could occur, for example, in a situation in which rule database 308 indicates that the part previously proposed is not in inventory, or that the availability or acquisition information regarding the part previously proposed is not acceptable. In such case, as action 9-27 the manager 310 can develop a suggestion for modifying the existing part, i.e., the target solid shape, in a manner so that an acceptable new part can be found without jeopardizing such concerns as the structural integrity of the mating of the existing part and the new part. For example, in the situation of FIG. 2A, if the rule database 308 were to indicate that a flat head Phillips screw with a two inch length and one half inch diameter were unavailable, as action 9-27 the manager 310 could suggest that first hole 242 of solid rectangular block 240 be modified to be one and three-quarter inches in length (depth) rather than two inches. Development of such a suggestion at action 9-27 may involve consultation with external sources, such as additional interaction with rule database 308 (as indicated by optional action 9-28).

If manager 310 is able at action 9-27 to develop a suggestion for modification of the existing part in order better to accommodate a prospective new part, as action 9-29 the manager 310 informs the connector object for the existing part of the suggested combination. In response, as action 9-30 the connector object for the existing part determines whether it is able to modify its feature of the existing part in accordance with the suggestion. In the FIG. 2A situation, for example, connector object 416 for first hole 242 of solid rectangular block 240 determines (consulting object 400 for solid rectangular block 240 if necessary) whether the depth of first hole 242 can be shortened from two inches to one and three-quarter inches. If the modification of the existing part is feasible, perhaps through a human decision by prompting to a designer, modification of the connector object for the existing part occurs as action 9-31. For example, data in the physical parameter(s) field 450-4 of the connector object 416 for first hole 242 of solid rectangular block 240 is modified. As action 9-32, the connector object of the existing part notifies the manager 310 whether or not such modification was possible, and (when possible) confirms that it has been reconfigured accordingly.

Action 9-33 shows the manager 310 checking the notification from the connector object for the existing part to ascertain whether adaptation was possible to conform to the suggestion. If not, an error condition occurs (action 9-34) involving, e.g., an error message. If the suggestion for modification developed at action 9-27 was accepted by the existing part, the process of configuring the new part begins again as indicated by connector 5-B which leads back to action 5-7 on page 5B.

The intelligent configurator 304 thus aids designers and engineers in the selection, sizing, and positioning of parts within an assembly, based on the embedded design intelligence carried by the part itself, the design context into which it is applied, and key business criteria. Furthermore, the manager 310 suggests certain design behavior based on design context requirements to assist the engineers to accomplish a quality design in shorter time. To enable different design rules and specialized design behavior, the intelligent configurator 304 also serves as a framework to allow custom rules and behavior controls implemented on this framework. The intelligent configurator 304 automates major assembly design steps following given rules, and lets the engineers focus on creative thinking and decision-making. Through its customization framework, the intelligent configurator 304 allows previous design experience and company specific behavior control to be considered in the early stage of assembly design. This innovation significantly improves the engineering design process in the area of assembly design; improves the quality of decision-making; and is an excellent addition to engineering design systems.

Thus, instead of merely manually inserting a selected solid shape into an assembly or scene, as described herein in certain implementations the inserted solid shape carries enough intelligence or information to indicate to what other solid shape it may mate. In one example implementation, the matching is facilitated by connector objects which possess sufficient information that intelligent configurator can ascertain matching pairs of connector objects, and accordingly configure, position, and orient the respective solid shapes for the matching connector objects in the assembly. In some situations in which there are plural possible matching connector objects, how and where the drop of the movant solid shape into the assembly occurs may influence the formation of a matching to form a pair of connector objects. Once a matching pair of connector objects is found, the intelligent configurator knows how to position the solid shapes which possess the connector objects relative to one another and otherwise configure one or both of those solid shapes.

The intelligent configurator 304 ascertains the valid candidates of an inserted or new solid part, and also determines the right size and position based on the geometry or attributes of one or more features of the target solid shape and/or the candidate parts. If company resource information is available, intelligent configurator 304 also may make suggestion on selection among the candidates based on the given criteria. Even specific context behavior such as assigning positional constraints between an inserted solid shape and a target solid shape, or performing an interference check with respect to the two solid parts, can be invoked provided such intelligence exists. Thus, with intelligent configurator 304, the designer needs only to perform such actions as dragging and dropping the new solid shape to be inserted proximate the target solid shape. The tedious searching of correct parts, precise positioning, and checking company rules is automated via intelligent configurator 304. Accordingly, the assembly design process becomes much more efficient.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer program product which provides a visual depiction of a three dimensional object upon a display device, the computer program product comprising computer readable coded instructions stored in a memory, the computer readable coded instructions being executable on a processor to which information is input via a user input device, wherein when the computer readable coded instructions are executed by the processor, the processor:

makes a selection of at least one candidate connector object of multiple possible connector objects of a target solid shape for matching with a particular connector object of a movant solid shape, the selection being based on connector object information of the at least one candidate connector object and the particular connector object of the movant solid shape, the movant solid shape having one or more connector objects including the particular connector object;

displays the target solid shape and the movant solid shape in accordance with the matching and in accordance with configuration information of at least one of the connector objects which are matched, wherein the program makes the selection from among the multiple appropriate connector objects based on a rule of a rule database, the rule database either comprising or operating in conjunction with an enterprise resource planning (ERP) system.

2. The computer program product of claim 1, wherein in positioning and displaying the movant solid shape and the target solid shape relative to one another, the program configures one of the movant solid shape and the target solid shape in accordance with the configuration information of at least one of the respective connector objects.

3. The computer program product of claim 2, wherein the program configures representative data of the movant solid shape as having a particular attribute in accordance with an attribute of the target solid shape.

4. The computer program product of claim 2, wherein the program configures the movant solid shape as having a particular size or dimension for compatibility with the target solid shape.

5. The computer program product of claim 2, wherein the program configures the movant solid shape as having a particular position relative to the target solid shape.

6. The computer program product of claim 2, wherein the program configures the movant solid shape as having a particular physical orientation relative to the target solid shape.

7. The computer program product of claim 1, wherein the program makes the selection from among the multiple appropriate connector objects based on a non-positional rule.

8. The computer program product of claim 7, wherein the configuration information includes procurement information which enables the program to use the non-positional rule to determine a procurement item for the movant solid shape.

9. The computer program product of claim 8, wherein the procurement information indicates multiple candidate vendors for the movant solid shape; and wherein the program uses the non-positional rule to determines a preferred vendor for the movant solid shape.

10. The computer program product of claim 9, wherein the program determines a preferred vendor for the movant solid shape based on the non-positional rule to.

11. The computer program product of claim 8, wherein the procurement information indicates multiple candidate procurement items for the movant solid shape; and wherein the program determines a preferred procurement item for the movant solid shape.

12. The computer program product of claim 7, wherein the program determines a preferred procurement item for the movant solid shape based on the non-positional rule to.

13. The computer program product of claim 12, wherein the non-positional rule relates to inventory criteria or availability criteria.

14. The computer program product of claim 12, wherein the non-positional rule relates to vendor criteria.

15. The computer program product of claim 1, wherein the program configures the movant solid shape as having a particular attribute in accordance with a predetermined rule.

16. The computer program product of claim 15, wherein the computer program configures representative data of the movant solid shape as having a particular attribute in accordance with a predetermined rule.

17. The computer program product of claim 15, wherein the predetermined rule is used to configure the movant solid shape as a particular member of a class of solid shapes represented by a generic solid shape.

18. The computer program product of claim 15, wherein the program uses the predetermined rule to configure the movant solid shape as a preferred procurement item.

19. The computer program product of claim 18, wherein the program uses the predetermined rule to configure the movant solid shape as a preferred procurement item supplied by a preferred vendor.

20. The computer program product of claim 18, wherein the program uses the predetermined rule to configure the movant solid shape as a preferred procurement item in accordance with inventory or availability.

21. The computer program product of claim 1, wherein when multiple candidate connector objects of the target solid shape exist, the program makes a selection from among the multiple candidate connector objects based on a predetermined rule.

22. A computer program product which provides a visual depiction of a three dimensional object upon a display device, the computer program product comprising computer readable coded instructions stored in a memory, the computer readable coded instructions being executable on a processor to which information is input via a user input device, wherein when the computer readable coded instructions are executed by the processor, the processor:

makes a selection of at least one candidate connector object of multiple possible connector objects of a target solid shape for matching with a particular connector object of a movant solid shape, the selection being based on connector object information of the at least one candidate connector object and the particular connector object of the movant solid shape, the movant solid shape having one or more connector objects including the particular connector object;

displays the target solid shape and the movant solid shape in accordance with the matching and in accordance with configuration information of at least one of the connector objects which are matched, wherein the program makes the selection from among the multiple appropriate connector objects based upon a boundary condition criteria.

23. The computer program product of claim 22, wherein when multiple candidate connector objects of the target solid shape exist, the program makes a selection from among the multiple candidate connector objects based on a predetermined rule.

24. The computer program product of claim 22, wherein in positioning and displaying the movant solid shape and the target solid shape relative to one another, the program configures one of the movant solid shape and the target solid shape in accordance with the configuration information of at least one of the respective connector objects.

25. The computer program product of claim 22, wherein the program makes the selection from among the multiple appropriate connector objects based on a non-positional rule.

26. The computer program product of claim 22, wherein the program configures the movant solid shape as having a particular attribute in accordance with a predetermined rule.

27. A three dimensional geometric modeling system comprising:

a processor which executes a program comprising set of coded instructions stored in a memory;

a display device upon which, when executed, the program provides a visual depiction of a three dimensional object comprising at least one solid shape, a user input device for inputting information to the processor;

wherein the processor in executing the program, and in response to communication via the user input device of insertion of a movant solid shape into a context including a target solid shape:
  makes a selection of at least one candidate connector object of multiple possible connector objects of target solid shape for matching with particular connector object of a movant solid shape, the selection being based on connector object information of the at least one candidate connector object and the particular connector object of the movant solid shape, the movant solid shape having one or more connector objects including the particular connector object;
  displays the target solid shape and the movant solid shape in accordance with the matching and in accordance with configuration information of at least one of the connector objects which are matched,
  wherein the program makes the selection from among the multiple appropriate connector objects based on a rule of a rule database, the rule database either comprising or operating in conjunction with an enterprise resource planning (ERP) system.

28. The modeling system of claim 27, wherein when multiple candidate connector objects of the target solid shape exist, the program makes a selection from among the multiple candidate connector objects based on a predetermined rule.

29. The modeling system of claim 27, wherein in positioning and displaying the movant solid shape and the target solid shape relative to one another, the program configures one of the movant solid shape and the target solid shape in accordance with the configuration information of at least one of the respective connector objects.

30. The modeling system of claim 27, wherein the program makes the selection from among the multiple appropriate connector objects based on a non-positional rule.

31. The modeling system of claim 27, wherein the program configures the movant solid shape as having a particular attribute in accordance with a predetermined rule.

32. The system of claim 31, wherein the program configures the movant solid shape as having a particular size or dimension for compatibility with the target solid shape.

33. The system of claim 31, wherein the program configures the movant solid shape as having a particular position relative to the target solid shape.

34. The system of claim 31, wherein the program configures the movant solid shape as having a particular physical orientation relative to the target solid shape.

35. The system of claim 31, wherein the predetermined rule is used to configure the movant solid shape as a particular member of a class of solid shapes represented by a generic solid shape.

36. The system of claim 31, wherein the program uses the predetermined rule to configure the movant solid shape as a preferred procurement item.

37. The system of claim 31, wherein the program uses the predetermined rule to configure the movant solid shape as a preferred procurement item supplied by a preferred vendor.

38. The system of claim 31, wherein the program uses the predetermined rule to configure the movant solid shape as a preferred procurement item in accordance with inventory or availability.

39. A three dimensional geometric modeling system comprising:
  a processor which executes a program comprising set of coded instructions stored in a memory;
  a display device upon which, when executed, the program provides a visual depiction of a three dimensional object comprising at least one solid shape,
  a user input device for inputting information to the processor;
  wherein the processor in executing the program, and in response to communication via the user input device of insertion of a movant solid shape into a context including a target solid shape:
    makes a selection of at least one candidate connector object of multiple possible connector objects of a target solid shape for matching with a particular connector object of a movant solid shape, the selection being based on connector object information of the at least one candidate connector object and the particular connector object of the movant solid shape, the movant solid shape having one or more connector objects including the particular connector object;
  displays the target solid shape and the movant solid shape in accordance with the matching and in accordance with configuration information of at least one of the connector objects which are matched,
  wherein the program makes the selection from among the multiple appropriate connector objects based on a boundary condition criteria.

40. The modeling system of claim 39, wherein when multiple candidate connector objects of the target solid shape exist, the program makes a selection from among the multiple candidate connector objects based on a predetermined rule.

41. The modeling system of claim 39, wherein in positioning and displaying the movant solid shape and the target solid shape relative to one another, the program configures one of the movant solid shape and the target solid shape in accordance with the configuration information of at least one of the respective connector objects.

42. The modeling system of claim 39, wherein the program makes the selection from among the multiple appropriate connector objects based on a non-positional rule.

43. The modeling system of claim 39, wherein the program configures the movant solid shape as having a particular attribute in accordance with a predetermined rule.

* * * * *